(12) United States Patent
Nagai et al.

(10) Patent No.: US 9,166,783 B2
(45) Date of Patent: Oct. 20, 2015

(54) PROTECTION METHOD, DECRYPTION METHOD, PLAYER, STORAGE MEDIUM, AND ENCRYPTION APPARATUS OF DIGITAL CONTENT

(75) Inventors: Yuji Nagai, Sagamihara (JP); Hiroyuki Sakamoto, Ome (JP); Hiroto Nakai, Yokohama (JP); Seiji Miyata, Tokyo (JP); Hideki Mimura, Yokohama (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 37 days.

(21) Appl. No.: 13/820,343

(22) PCT Filed: May 30, 2011

(86) PCT No.: PCT/JP2011/062860
§ 371 (c)(1),
(2), (4) Date: Mar. 1, 2013

(87) PCT Pub. No.: WO2012/049881
PCT Pub. Date: Apr. 19, 2012

(65) Prior Publication Data
US 2013/0163755 A1  Jun. 27, 2013

(30) Foreign Application Priority Data
Oct. 14, 2010 (JP) ................... 2010-231745

(51) Int. Cl.
*H04L 9/08* (2006.01)
(52) U.S. Cl.
CPC ............ *H04L 9/0833* (2013.01); *H04L 9/0816* (2013.01); *H04L 9/0822* (2013.01); *H04L 9/0894* (2013.01); *H04L 2209/60* (2013.01)

(58) Field of Classification Search
CPC ....... G06F 21/10; G06F 21/12; G06F 21/125; G06F 21/16; H04L 9/0833; H04L 9/0816; H04L 9/0822; H04L 9/0892
USPC .......................................................... 380/44
See application file for complete search history.

(56) References Cited

U.S. PATENT DOCUMENTS

| 4,757,468 A | 7/1988 | Domenik et al. |
| 4,910,774 A | 3/1990 | Barakat |
| 6,829,676 B2 | 12/2004 | Maeda et al. |

(Continued)

FOREIGN PATENT DOCUMENTS

| CN | 101084504 A | 12/2007 |
| EP | 1 126 355 A1 | 8/2001 |

(Continued)

OTHER PUBLICATIONS

Menezes, et al. "Handbook of Applied Cryptography," 1997, CRC Press LLC, pp. 42, 192, 226, 227 & 246.*

(Continued)

*Primary Examiner* — Darren B Schwartz
(74) *Attorney, Agent, or Firm* — Oblon, McClelland, Maier & Neustadt, L.L.P.

(57) ABSTRACT

A digital content protection method includes distributing, together with an encrypted content, an encrypted protected program key, a protected content key, and a protected code including an individual instruction code, at least some elements of which are designed according to a unique operation code specification for each content player or for each content player group.

25 Claims, 19 Drawing Sheets

(56) References Cited

U.S. PATENT DOCUMENTS

| | | |
|---|---|---|
| 6,950,379 B2 | 9/2005 | Yen et al. |
| 7,065,648 B1 | 6/2006 | Kamibayashi et al. |
| 7,240,157 B2 | 7/2007 | Frank et al. |
| 7,266,695 B2 | 9/2007 | Nakayama |
| 7,395,429 B2 | 7/2008 | Kitani et al. |
| 7,484,090 B2 | 1/2009 | Ohmori et al. |
| 7,533,276 B2 | 5/2009 | Matsushima et al. |
| 7,565,698 B2 | 7/2009 | Isozaki et al. |
| 7,712,131 B1 | 5/2010 | Lethe |
| 7,721,343 B2 | 5/2010 | Kato et al. |
| 7,890,773 B2 | 2/2011 | Kasahara et al. |
| 7,971,070 B2 | 6/2011 | Lotspiech et al. |
| 7,979,915 B2 | 7/2011 | Nakano et al. |
| 8,020,199 B2 | 9/2011 | Smith et al. |
| 8,131,646 B2 | 3/2012 | Kocher et al. |
| 8,260,259 B2 | 9/2012 | Semple et al. |
| 8,261,130 B2 | 9/2012 | Mayer et al. |
| 8,290,146 B2 | 10/2012 | Takashima |
| 8,296,477 B1 | 10/2012 | Polk |
| 8,321,924 B2 | 11/2012 | Lu et al. |
| 8,336,096 B2 | 12/2012 | Narusawa et al. |
| 8,364,881 B2 | 1/2013 | Urabe |
| 8,381,062 B1 | 2/2013 | Juels et al. |
| 8,510,548 B1 | 8/2013 | Markov et al. |
| 8,677,144 B2 | 3/2014 | Haider et al. |
| 2001/0021255 A1 | 9/2001 | Ishibashi |
| 2002/0059518 A1 | 5/2002 | Smeets et al. |
| 2002/0087814 A1 | 7/2002 | Ripley et al. |
| 2002/0087871 A1 | 7/2002 | Ripley |
| 2002/0116632 A1 | 8/2002 | Itoh et al. |
| 2003/0070082 A1 | 4/2003 | Nimura et al. |
| 2003/0105961 A1 | 6/2003 | Zatloukal et al. |
| 2003/0142824 A1* | 7/2003 | Asano et al. ............ 380/277 |
| 2003/0154355 A1 | 8/2003 | Fernandez |
| 2003/0200411 A1 | 10/2003 | Maeda et al. |
| 2003/0221116 A1* | 11/2003 | Futoransky et al. .......... 713/189 |
| 2004/0039924 A1 | 2/2004 | Baldwin et al. |
| 2004/0133794 A1* | 7/2004 | Kocher et al. ............ 713/193 |
| 2004/0190868 A1 | 9/2004 | Nakano et al. |
| 2005/0038997 A1* | 2/2005 | Kojima et al. ............ 713/165 |
| 2005/0039022 A1* | 2/2005 | Venkatesan et al. .......... 713/176 |
| 2005/0086497 A1 | 4/2005 | Nakayama |
| 2005/0128050 A1 | 6/2005 | Frolov et al. |
| 2005/0182948 A1 | 8/2005 | Ducharme |
| 2005/0183072 A1* | 8/2005 | Horning et al. ............ 717/140 |
| 2005/0257243 A1 | 11/2005 | Baker |
| 2005/0262347 A1* | 11/2005 | Sato et al. .......... 713/176 |
| 2006/0060065 A1 | 3/2006 | Abe et al. |
| 2006/0085644 A1 | 4/2006 | Isozaki et al. |
| 2006/0141987 A1 | 6/2006 | De Groot |
| 2007/0074050 A1* | 3/2007 | Camiel ............ 713/193 |
| 2007/0100759 A1 | 5/2007 | Kasahara et al. |
| 2007/0143838 A1 | 6/2007 | Milligan et al. |
| 2007/0165860 A1* | 7/2007 | Handa et al. .......... 380/259 |
| 2007/0174198 A1 | 7/2007 | Kasahara et al. |
| 2007/0186110 A1 | 8/2007 | Takashima |
| 2008/0049934 A1* | 2/2008 | Onoda et al. .......... 380/201 |
| 2008/0098212 A1 | 4/2008 | Helms et al. |
| 2008/0101604 A1 | 5/2008 | Kocher et al. |
| 2008/0210747 A1* | 9/2008 | Takashima .......... 235/375 |
| 2008/0228821 A1* | 9/2008 | Mick et al. .......... 707/104.1 |
| 2008/0263362 A1 | 10/2008 | Chen |
| 2008/0294562 A1 | 11/2008 | Kasahara et al. |
| 2009/0086966 A1* | 4/2009 | Haruki et al. .......... 380/44 |
| 2009/0106551 A1 | 4/2009 | Boren et al. |
| 2009/0232314 A1 | 9/2009 | Kato et al. |
| 2009/0249492 A1* | 10/2009 | Boesgaard Sorensen ...... 726/27 |
| 2009/0313480 A1 | 12/2009 | Michiels et al. |
| 2010/0008509 A1 | 1/2010 | Matsushita et al. |
| 2010/0017626 A1 | 1/2010 | Sato et al. |
| 2010/0107245 A1* | 4/2010 | Jakubowski et al. .......... 726/22 |
| 2010/0146501 A1 | 6/2010 | Wyatt et al. |
| 2010/0199129 A1 | 8/2010 | Kitani |
| 2010/0268953 A1 | 10/2010 | Matsukawa et al. |
| 2010/0275036 A1 | 10/2010 | Harada et al. |
| 2011/0222691 A1 | 9/2011 | Yamaguchi et al. |
| 2011/0225089 A1 | 9/2011 | Hammad |
| 2011/0276490 A1 | 11/2011 | Wang et al. |
| 2012/0137135 A1 | 5/2012 | Kasahara et al. |
| 2012/0137137 A1 | 5/2012 | Brickell et al. |
| 2012/0272065 A1 | 10/2012 | Matsukawa et al. |
| 2012/0290814 A1 | 11/2012 | Walker |
| 2013/0054961 A1 | 2/2013 | Kato et al. |
| 2013/0124854 A1 | 5/2013 | Kato et al. |
| 2013/0262877 A1 | 10/2013 | Neve De Mevergnies et al. |

FOREIGN PATENT DOCUMENTS

| | | |
|---|---|---|
| EP | 1 983 466 A2 | 10/2008 |
| EP | 1 983 466 A3 | 10/2008 |
| JP | 63-29785 | 2/1988 |
| JP | 63-70634 | 3/1988 |
| JP | 3-171231 A | 7/1991 |
| JP | 8-204702 A | 8/1996 |
| JP | 10-232918 A | 9/1998 |
| JP | 2000-122931 A | 4/2000 |
| JP | 2001-209305 | 8/2001 |
| JP | 2003-143128 | 5/2003 |
| JP | 2003-233795 A | 8/2003 |
| JP | 2004-30326 A | 1/2004 |
| JP | 2005-316946 | 11/2005 |
| JP | 2005-341156 | 12/2005 |
| JP | 2005-341156 A | 12/2005 |
| JP | 2006-172147 A | 6/2006 |
| JP | 2007-208897 | 8/2007 |
| JP | 2007-525748 A | 9/2007 |
| JP | 2008-22367 A | 1/2008 |
| JP | 2008-35397 A | 2/2008 |
| JP | 2008-506317 A | 2/2008 |
| JP | 2008-84445 A | 4/2008 |
| JP | 2008-269088 A | 11/2008 |
| JP | 2009-87497 A | 4/2009 |
| JP | 2009-100394 A | 5/2009 |
| JP | 2009-105566 | 5/2009 |
| JP | 2009-543244 | 12/2009 |
| JP | 2010-28485 A | 2/2010 |
| JP | 2010-140470 | 6/2010 |
| JP | 2010-183278 A | 8/2010 |
| JP | 2010-267240 A | 11/2010 |
| JP | 2010-267540 A | 11/2010 |
| JP | 2010-268417 A | 11/2010 |
| JP | 2010-287005 A | 12/2010 |
| JP | 2011-209802 A | 10/2011 |
| JP | 2011-215983 A | 10/2011 |
| JP | 2012-14416 A | 1/2012 |
| JP | 2013-55370 | 3/2013 |
| JP | 2013-106162 | 5/2013 |
| TW | I266190 | 11/2006 |
| WO | WO 01/11883 A1 | 2/2001 |
| WO | WO 02/33521 A2 | 4/2002 |
| WO | WO 02/33521 A3 | 4/2002 |
| WO | WO 03/048938 A1 | 6/2003 |
| WO | WO 2007/028099 A2 | 3/2007 |
| WO | WO 2010/035449 A1 | 4/2010 |
| WO | WO 2011/064883 A1 | 6/2011 |

OTHER PUBLICATIONS

International Search Report and Written Opinion issued Aug. 16, 2012 in PCT/JP2012/058276 filed Mar. 19, 2012.

International Search Report and Written Opinion issued Nov. 22, 2012 in PCT /JP2012/065935, filed Jun. 15, 2012.

International Search Report and Written Opinion issued Nov. 22, 2012 in PCT/JP2012/065932, filed Jun. 15, 2012.

International Search Report and Written Opinion issued Nov. 22, 2012 in PCT/JP2012/065933, filed Jun. 15, 2012.

International Search Report and Written Opinion issued Nov. 22, 2012 in PCT/JP2012/065937, filed Jun. 15, 2012.

International Search Report and Written Opinion issued Nov. 22, 2012 in PCT/JP2012/065938, filed Jun. 15, 2012.

International Search Report and Written Opinion issued Nov. 22, 2012, in PCT/JP2012/065934 filed Jun. 15, 2012.

(56) References Cited

OTHER PUBLICATIONS

Office Action issued Oct. 16, 2012 in Japanese Patent Application No. 2011-265281 with English language translation.
Office Action issued Oct. 16, 2012 in Japanese Patent Application No. 2011-265289 with English language translation.
Office Action issued Nov. 27, 2012 in Japanese Patent Application No. 2011-265281 with English Translation.
Office Action issued Nov. 20, 2012 in Japanese Patent Application No. 2011-248056 with English Translation.
"Media Identifier Management Technology Specification", Revision 0.85 Preliminary Release, 4C Entity LLC, www.4centity.com, Sep. 27, 2010, 13 Pages.
"Content Protection for Recordable Media Specification", 4C Entity, LLC., http://www.4centity.com, Revision 1.0, Jan. 17, 2003, 31 pages.
"Content Protection for Recordable Media Specification: SD Memory Card Book Common Part", 4C Entity LLC, www.4centity.com, Revision 0.97, Dec. 15, 2010, 20 Pages.
"Content Protection for Recordable Media Specification: Introduction and Common Cryptographic Elements", 4C Entity, LLC, http://www.4centity.com, Revision 1.1, Dec. 15, 2010, 38 pages.
"Content Protection for eXtended Media Specification: Introduction and Common Cryptographic Elements", 4centity, Revision 0.85 Preliminary Release, Sep. 27, 2010, 16 pages.
"Content Protection for Prerecorded Media Specification: Introduction and Common Cryptographic Elements", 4centity, Revision 1.0, Jan. 17, 2003, 25 pages.
"Content Protection for eXtended Media Specification: SD Memory Card Book Common Part", 4centity, Revision 0.85 Preliminary Release, Sep. 27, 2010, 38 pages.
David Hoff et al., "System and Software Security via Authentication Handshake in EPROM", 1985 Proceedings of the National Computer Conference, The Internet, <URL: http://www.computerorg/csdl/proceedings/afips/1985/5092/00/50920203-abs.html>, vol. 54, 1985, pp. 203-209 and cover pages.
"Next Generation Secure Memory", www.nextgenerationsecurememory.com, Mar. 2012, 9 Pages.
Dalit Naor et al., "Revocation and Tracing Schemes for Stateless Receivers", Proc. CRYPTO 2001, LNCS 2139, Springer-Verlag, 2001, pp. 41-62.
Kocher, P., et al., "Self-Protecting Digital Content—A Technical Report From the CRI Content Security Research Initiative," Cryptography Research, Inc., http://www.cryptography.com/public/pdf/selfprotectingcontent.pdf, 2003, pp. 1-14.
"Introduction and Common Cryptographic Elements Book," Advanced Access Content System (AACS), Revision 0.953, http://www.aacsla.com/specifications, Oct. 26, 2012, Total 102 Pages.
"Pre-recorded Video Book," Advanced Access Content System (AACS), Revision 0.952, http://www.aacsla.com/specifications, Jul. 14, 2011, Total 86 Pages.
International Search Report Issued Jun. 28, 2011 in PCT/JP11/62860 Filed May 30, 2011.
"Prepared Video Book," Advanced Access Content System (AACS), Revision 0.953, http://www.aacsla.com/specifications, Oct. 26, 2012, Total 45 Pages.
"Recordable Video Book," Advanced Access Content System (AACS), Revision 0.953, http://www.aacsla.com/specifications, Oct. 26, 2012, Total 22 Pages.
"Blu-ray Disc Pre-recorded Book," Advanced Access Content System (AACS), Revision 0.953, http://www.aacsla.com/specifications, Oct. 26, 2012, Total 173 Pages.
"Blu-ray Disc Prepared Video Book," Advanced Access Content System (AACS), Revision 0.953, http://www.aacsla.com/specifications, Oct. 26, 2012, Total 59 Pages.
"Blu-ray Disc Recordable Book," Advanced Access Content System (AACS), Revision 0.953, http://www.aacsla.com/specifications, Oct. 26, 2012, Total 61 Pages.
"HD DVD and DVD Pre-recorded Book," Advanced Access Content System (AACS), Revision 0.953, http://www.aacsla.com/specifications, Oct. 26, 2012, Total 154 Pages.
"HD DVD and DVD Prepared Video Book," Advanced Access Content System (AACS), Revision 0.953, http://www.aacsla.com/specifications, Oct. 26, 2012, Total 43 Pages.
"HD DVD and DVD Recordable Book," Advanced Access Content System (AACS), Revision 0.953, http://www.aacsla.com/specifications, Oct. 26, 2012, Total 65 Pages.
"Signed CSS Book," Advanced Access Content System (AACS), Revision 0.953, http://www.aacsla.com/specifications, Oct. 26, 2012, Total 18 Pages.
"Introduction and Common Cryptographic Elements," Advanced Access Content System (AACS), Revision 0.91, http://www.aacsla.com/specifications, Feb. 17, 2006, Total 82 Pages.
"Pre-recorded Video Book," Advanced Access Content System (AACS), Revision 0.92, http://www.aacsla.com/specifications, Total 61 Pages, (Nov. 29, 2007).
"Recordable Video Book," Advanced Access Content System (AACS), Revision 0.91, http://www.aacsla.com/specifications, Total 23 Pages, (Feb. 17, 2006).
"CBHD Pre-recorded Book," Advanced Access Content System (AACS), Revision 0.90, http://www.aacsla.com/specifications, Total 91 Pages, (Oct. 7, 2008).
"Blu-ray Disc Pre-recorded Book," Advanced Access Content System (AACS), Revision 0.921, http://www.aacsla.com/specifications, Total 117 Pages, (Jun. 6, 2008).
"Blu-ray Disc Recordable Book," Advanced Access Content System (AACS), Revision 0.921, http://www.aacsla.com/specifications, Total 55 Pages, (Aug. 5, 2008).
"HD DVD and DVD Pre-recorded Book," Advanced Access Content System (AACS), Revision 0.912, http://www.aacsla.com/specifications, Total 166 Pages, (Aug. 15, 2006).
"HD DVD and DVD Recordable Book," Advanced Access Content System (AACS), Revision 0.921, http://www.aacsla.com/specifications, Total 59 Pages, (Jul. 25, 2006).
Japanese Office Action issued Nov. 22, 2013, in Japan Patent Application No. 2012-209681 (with English translation).
Taiwanese Office Action issued Nov. 4, 2013, in Taiwan Patent Application No. 100120444.
Japanese Office Action issued Apr. 15, 2014, in Japan Patent Application No. 2013-032349 (with English translation).
"Content Protection for Recordable Media Specification SD Memory Card Book Common Part", (Intel Corporation), Revision 0.96, Nov. 26, 2001, 4C Entity, LLC, 36 pages.
English translation of the International Preliminary Report on Patentability issued Apr. 25, 2013 in PCT/JP2011/062860 filed May 30, 2011.
English translation of the Written Opinion of the International Searching Authority issued Jun. 28, 2011 in PCT/JP2011/062860 filed May 30, 2011.
U.S Office Action issued on Sep. 8, 2014 in U.S. Appl. No. 13/773,822 (11 pages).
U.S. Office Action issued on Aug. 29, 2014 in U.S. Appl. No. 14/091,530 (30 pages).
U.S. Office Action issued on Sep. 5, 2014 in U.S. Appl. No. 13/772,611 (13 pages).
U.S. Office Action issued on Jul. 11, 2014 in U.S. Appl. No. 13/768,476. (31 pages).
Office Action issued Jul. 31, 2015 in co-pending U.S. Appl. No. 13/766,940.
Office Action issued Jul. 27, 2015, in Chinese Patent Application No. 201280037800.X (English translation provided).

\* cited by examiner

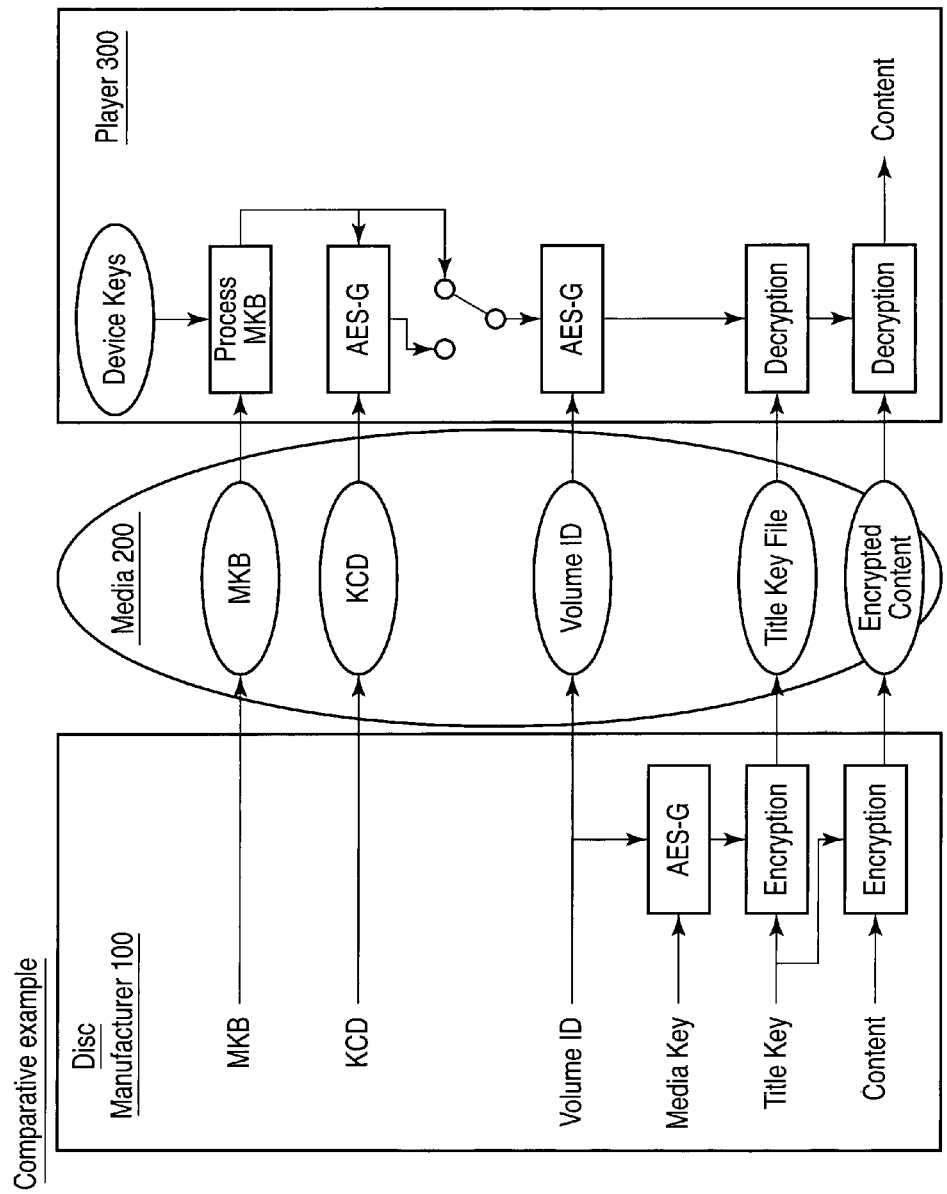
F I G. 1

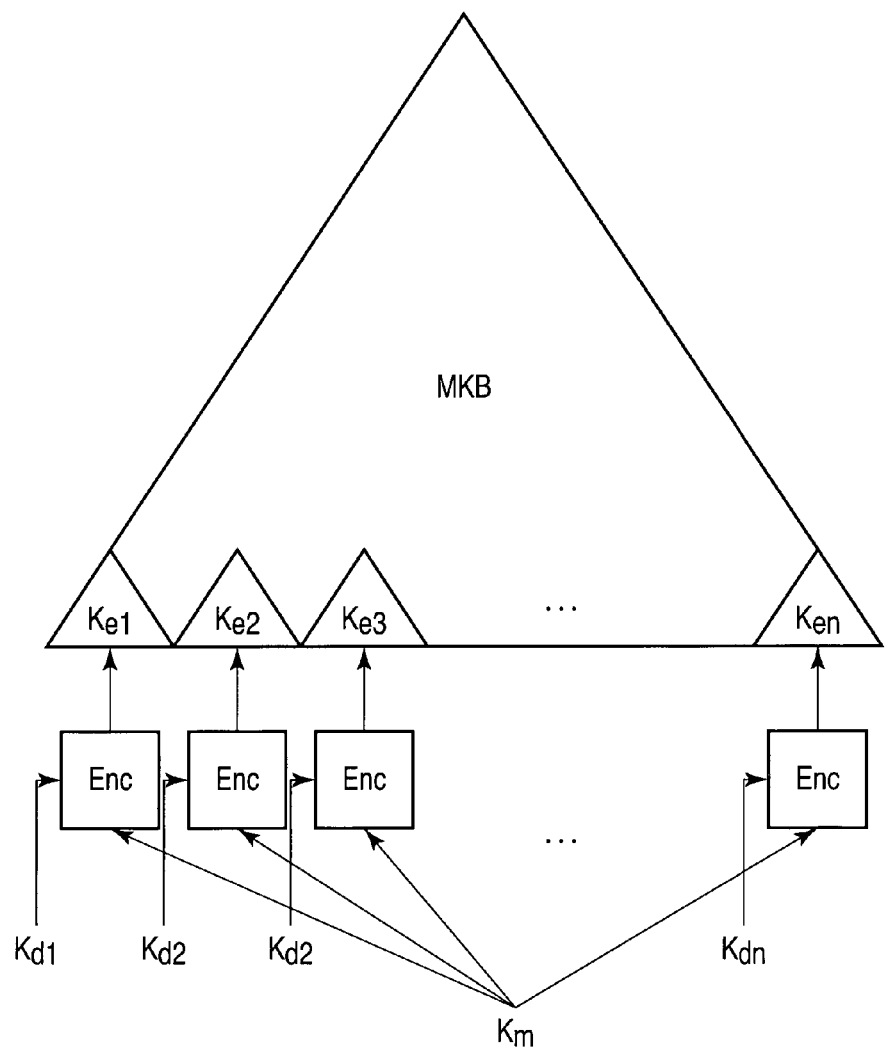
F I G. 2

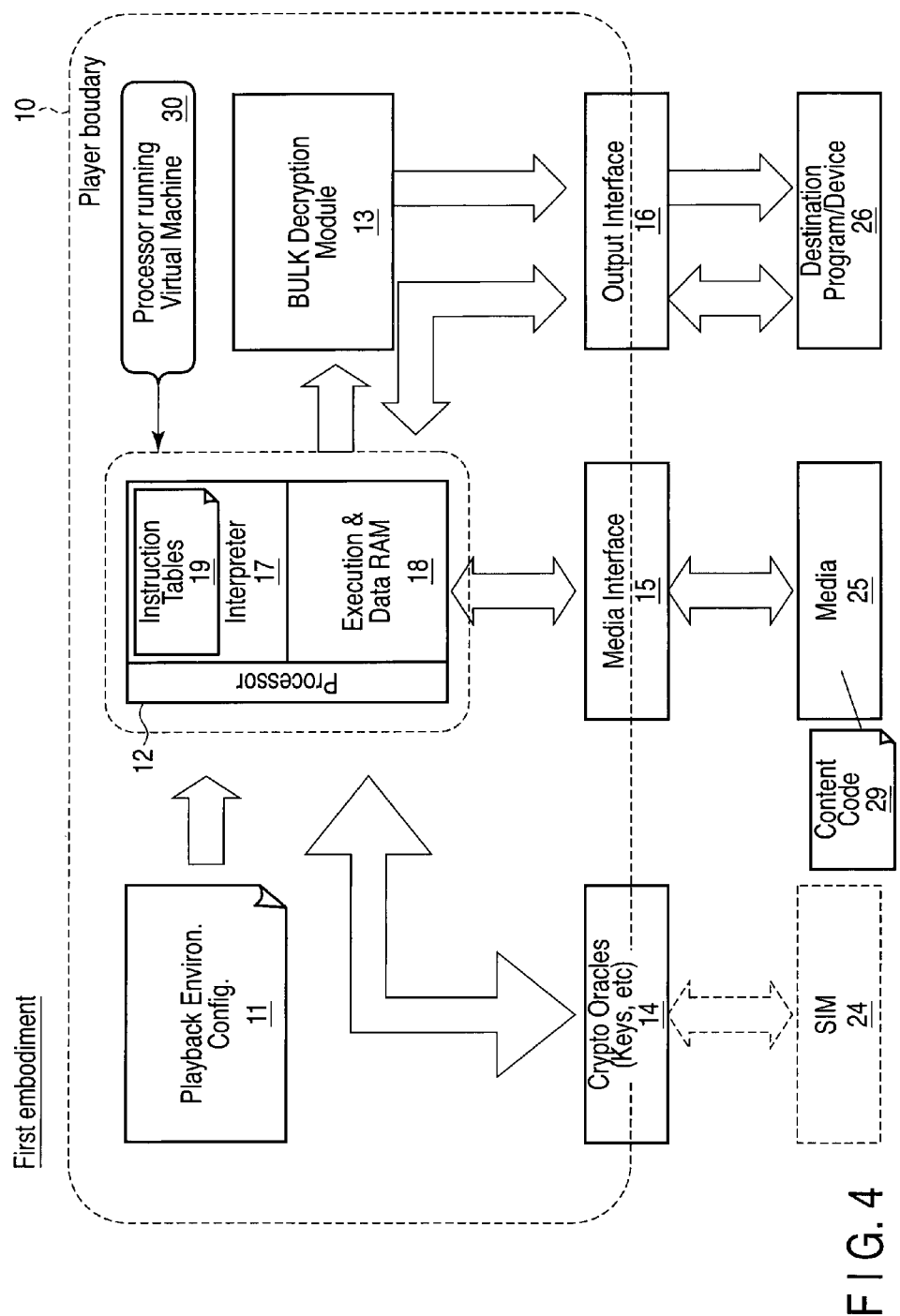
F I G. 4

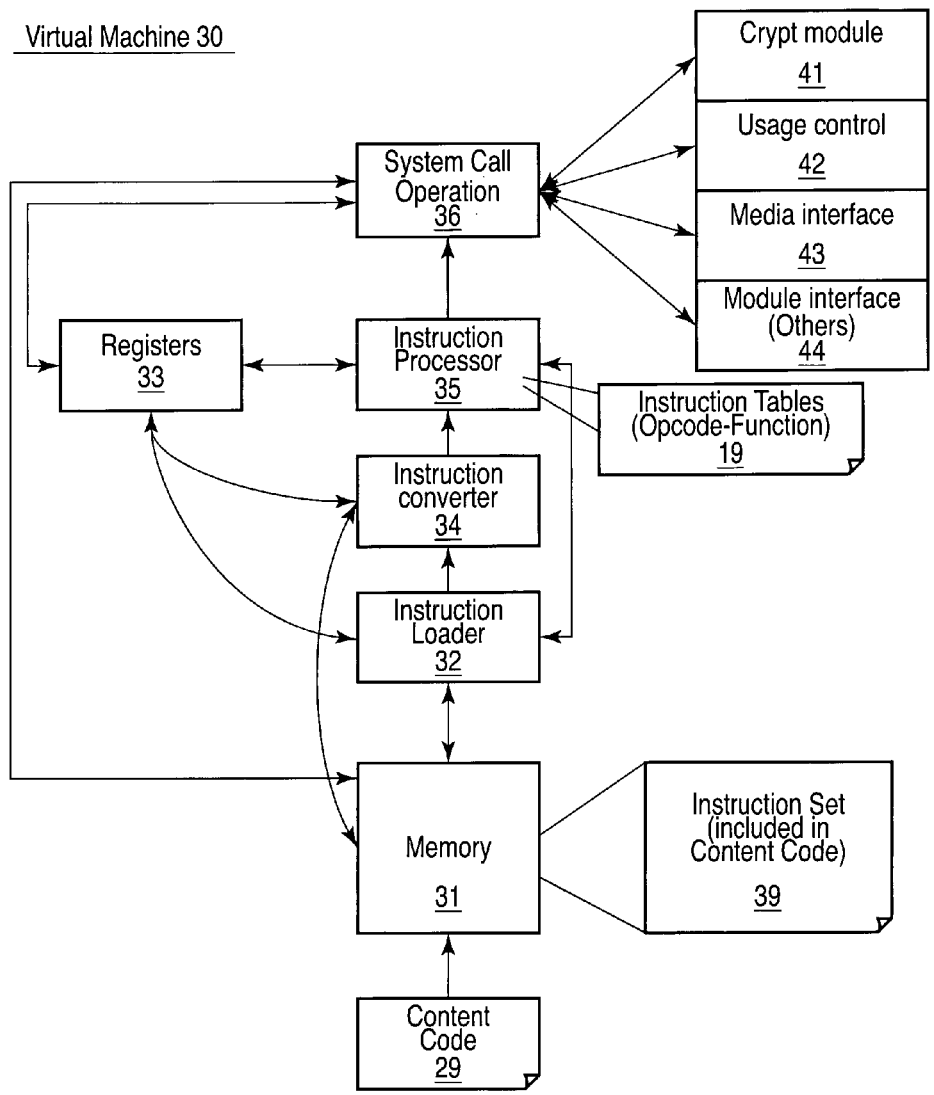
F I G. 5

Instruction Set 39

| Opcode | Mnemonic | Meaning |
|---|---|---|
| 0x01, 0x02, 0x03 | LB, LBU, SB | Load byte, Load unsigned byte, Store byte |
| 0x04, 0x05, 0x06, 0x07, 0x08 | LH, LHU, SH, LW, SW | Load half word(signed/unsigned), Store half word, Load word, Store word |
| 0x09, 0x0A, 0x0B, 0x0C | ADD, ADDI, ADDU, ADDUI | Add, Add immediate, Add(Unsigned), Add immediate(Unsigned) |
| 0x0D, 0x0E, 0x0F, 0x10 | SUB, SUBI, SUBU, SUBUI | Subtract, Subtract immediate, Subtract(Unsigned), Subtract immediate(Unsigned) |
| 0x11, 0x12, 0x13, 0x14 | MULT, MULTI, MULTU, MULTUI | Multiply, Multiply immediate, Multiply(Unsigned), Multiply immediate(Unsigned) |
| 0x15, 0x16 | AND, ANDI | And, And immediate |
| 0x17, 0x18 | OR, ORI | Or, Or immediate |
| 0x19, 0x1A | XOR, XORI | Xor, Xorimmediate |
| 0x1B, 0x1C | SLL, SLLI | Bitwise left shift(Variable/Immediate) |
| 0x1D, 0x1E, 0x1F, 0x20 | SRA, SRAI, SRL, SRLI | Arithmetic right shift(Variable/Immediate) Bitwise right shift(Variable/Immediate) |
| 0x21, 0x22, 0x23, 0x24, 0x25, 0x26 | SLT, SGT, SLE, SGE, SEQ, SNE | Conditional sets |
| ... | ... | ... |
| 0x?? | SYSCALL | System call |
| ... | ... | ... |

FIG. 6

Instruction Tables 19

Common Instruction Table (19-0)

| Opcode | Mnemonic |
|---|---|
| C(i), C(i+1), C(i+2), ... | LB, LBU, SB |
| | LH, LHU, SH, LW, SW |
| | ADD, ADDI, ADDU, ADDUI |
| | ... |

(a) Common instruction table

Instruction Table #1 (19-1)

| Opcode | Mnemonic |
|---|---|
| X(i), X(i+1), X(i+2), ... | LB, LBU, SB |
| | LH, LHU, SH, LW, SW |
| | ADD, ADDI, ADDU, ADDUI |
| | ... |

Instruction Table #2 (19-2)

| Opcode | Mnemonic |
|---|---|
| Y(i), Y(i+1), Y(i+2), ... | LB, LBU, SB |
| | LH, LHU, SH, LW, SW |
| | ADD, ADDI, ADDU, ADDUI |
| | ... |

Instruction Table #3 (19-3)

| Opcode | Mnemonic |
|---|---|
| Z(i), Z(i+1), Z(i+2), ... | LB, LBU, SB |
| | LH, LHU, SH, LW, SW |
| | ADD, ADDI, ADDU, ADDUI |
| | ... |

(b) Individual instruction table

F I G. 8

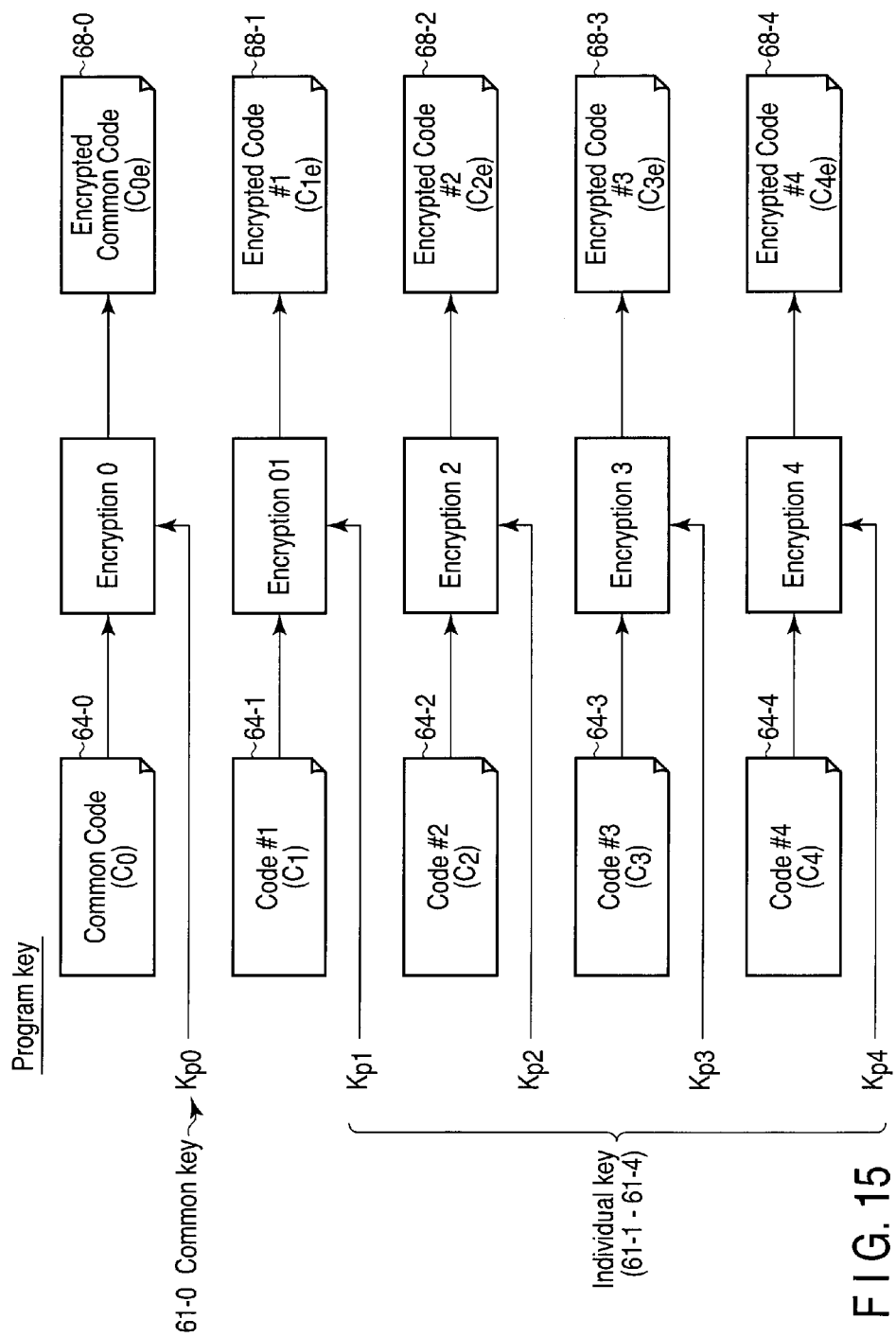
F I G. 15

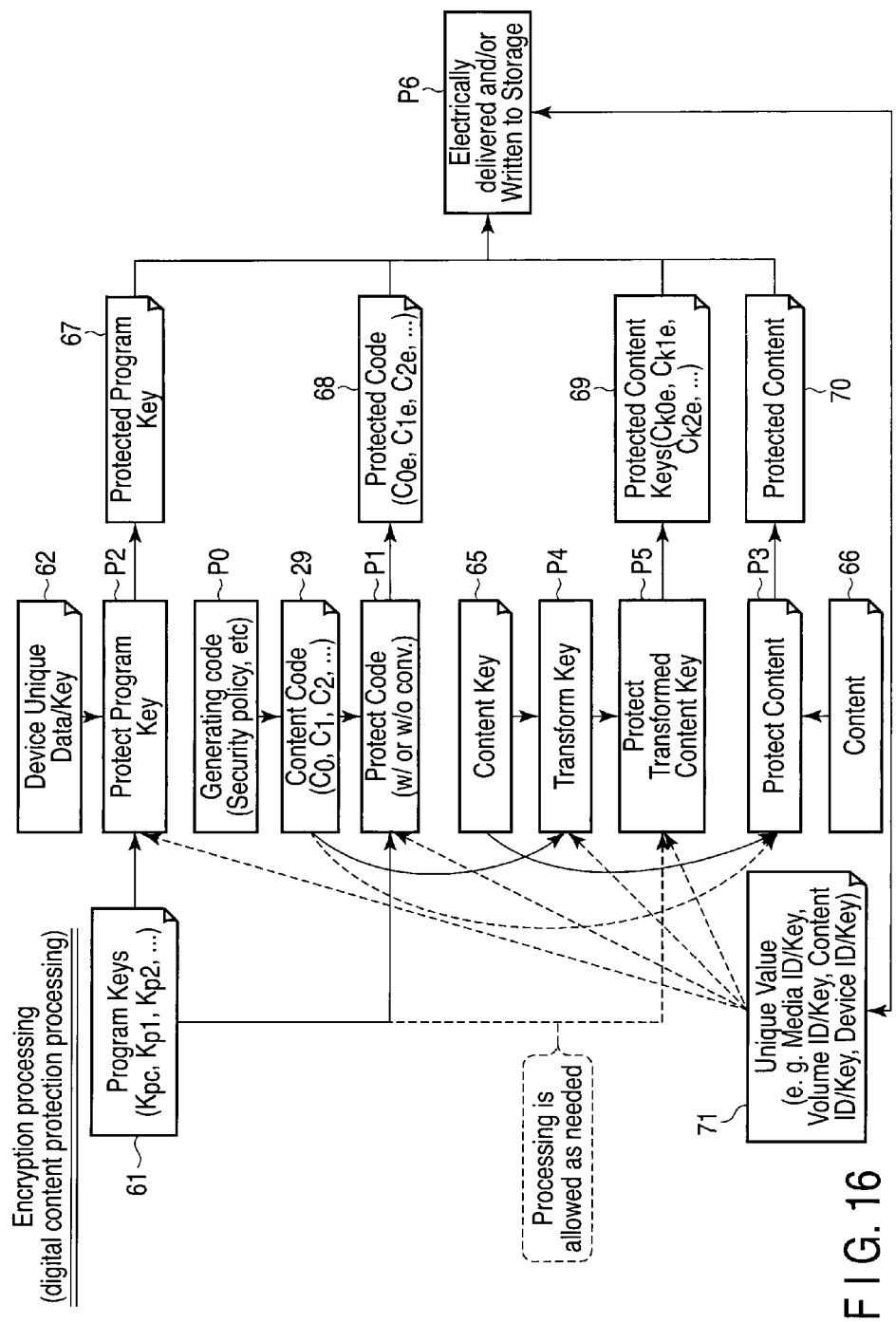
F I G. 16

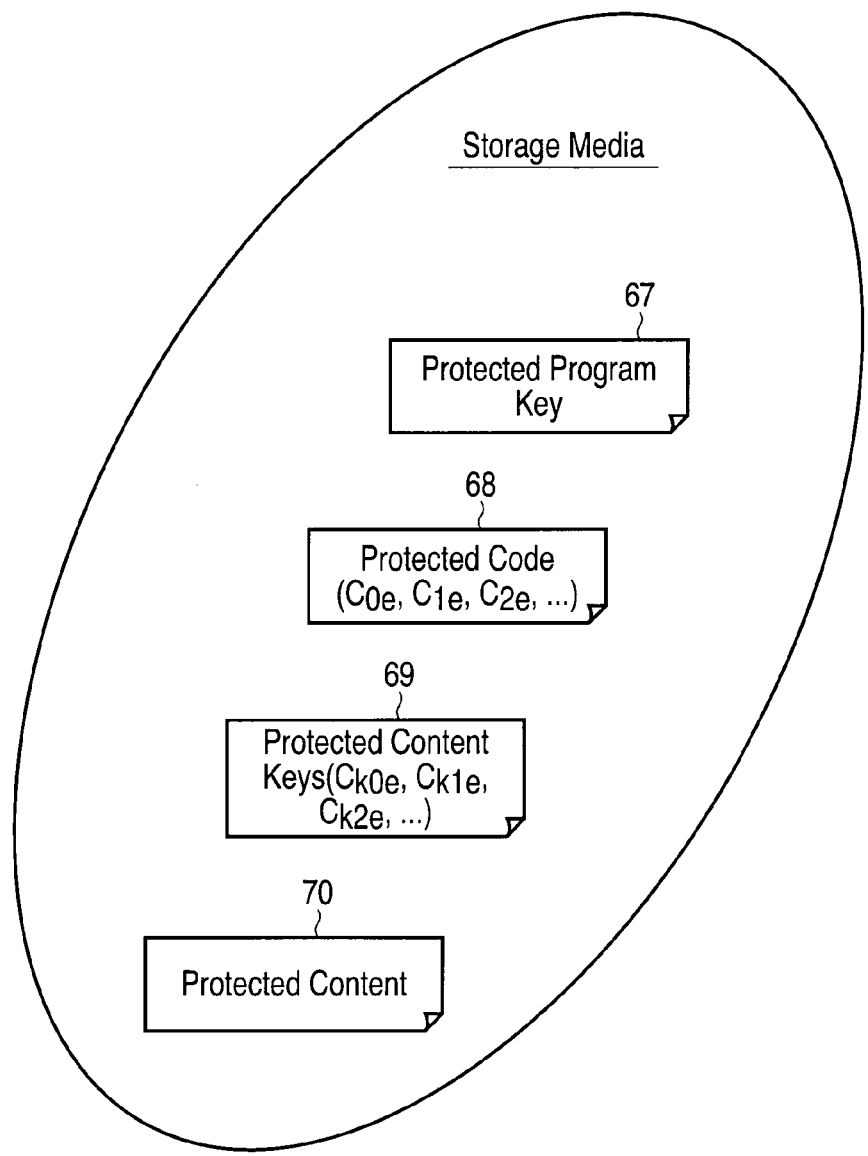
F I G. 17A

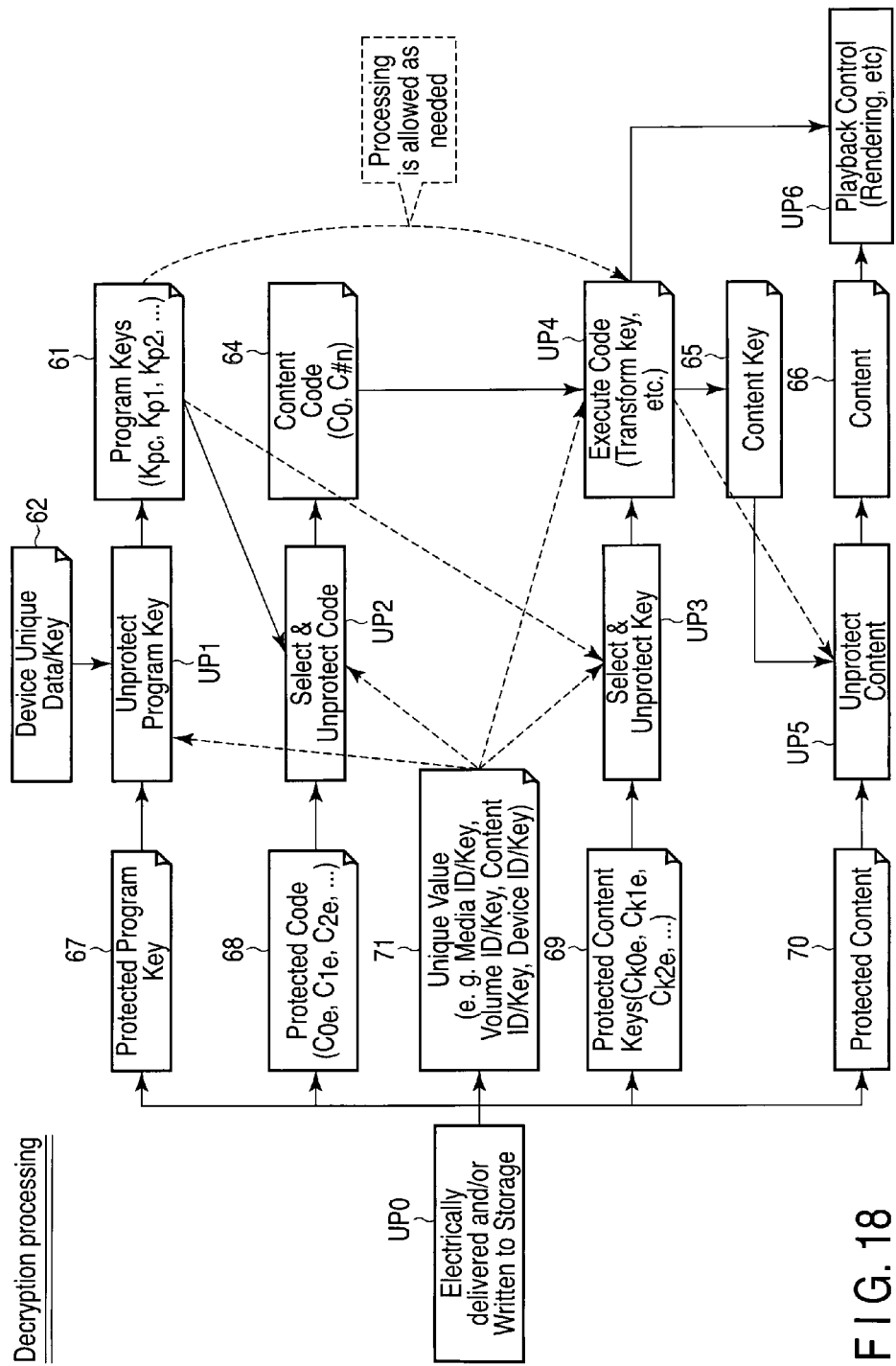
F I G. 18

PROTECTION METHOD, DECRYPTION METHOD, PLAYER, STORAGE MEDIUM, AND ENCRYPTION APPARATUS OF DIGITAL CONTENT

CROSS-REFERENCE TO RELATED APPLICATIONS

The present application is a U.S. national phase application under 35 U.S.C. §371 of International Application PCT/JP2011/062860 (not published in English), filed May 30, 2011, and claims priority to JP2010-231745 filed Oct. 14, 2010, the entire contents of each of which are incorporated herein by reference.

TECHNICAL FIELD

The embodiments relate to a protection method, decryption method, player, storage medium, and encryption apparatus of a digital content.

BACKGROUND ART

A copyright protection system specifies a method of distributing a content generally as a copyrighted work in an encrypted format. Since an encryption key used to encrypt a content is secret information, illicit copy protection is made by, for example, encrypting the encryption key itself using another encryption key.

DISCLOSURE OF INVENTION

According to an embodiment, a digital content protection method comprising: generating a protected code by encrypting a content code including an individual instruction code; generating a protected program key by encrypting a program key; generating a protected content by encrypting a content with a content key; generating a protected content key by encrypting the content key; and distributing, together with the protected content, the protected program key, the protected content key and the protected code, wherein at least one element of the individual instruction code is designed according to a unique operation code specification for each content player or for each content player group.

BRIEF DESCRIPTION OF DRAWINGS

FIG. 1 is a chart showing an AACS content protection sequence according to a comparative example;

FIG. 2 is a view for explaining key invalidation based on an MKB according to the comparative example;

FIG. 4 is a block diagram showing a player based on an SPDC technique using a virtual machine according to the first embodiment;

FIG. 5 is a block diagram showing an example of the structure of the virtual machine according to the first embodiment;

FIG. 6 shows an instruction set according to the first embodiment;

FIG. 8 shows instruction tables according to the first embodiment;

FIG. 15 is a chart for explaining program keys according to the first embodiment;

FIG. 16 is a flowchart for explaining encryption processing (digital content protection processing) according to the first embodiment;

FIG. 17A is a view showing an example of a storage medium after the encryption processing according to the first embodiment;

FIG. 18 is a flowchart for explaining decryption processing according to the first embodiment.

BEST MODE FOR CARRYING OUT THE INVENTION

Figure 3:
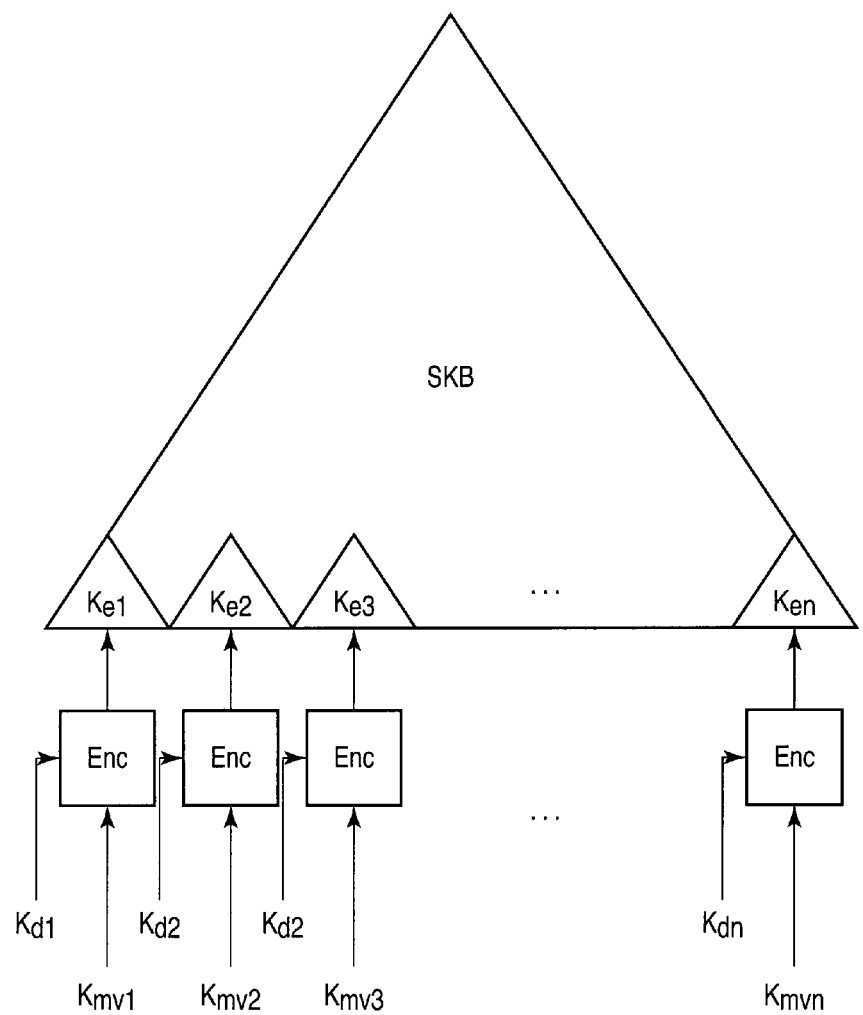
FIG. 3 is a view for explaining key invalidation based on an SKB according to the comparative example.

As copyright protection systems, proprietary specifications which are specified by specific companies and de facto standard specifications which are specified by an association including a plurality of companies are known. As for management of the copyright protection systems, a case in which, for example, an encryption key is set as secret information but a system is open to the public, and a case in which the copyright protection system itself is also set as secret information are known. In either case, in order to manufacture a player which is compliant with an arbitrary copyright protection system, secret information such as an encryption key and content decryption specifications have to be acquired from a copyright protection system management organization. A player is designed and manufactured according to the content decryption specification, and is marketed while incorporating an encryption key in a form which is not easily exposed.

However, in recent years, an encryption key is acquired from the interior of the player or via other routes, and is used in illicit copies of contents. For example, removal software of the CSS (Content Scramble System) as a copyright protection system in DVDs (Digital Versatile Discs) and that of the AACS (Advanced Access Content System) as a copyright protection system in Blu-Ray discs are used to illicitly acquire and distribute contents using illicitly acquired encryption keys.

For this reason, as additional content illicit use measures in the copyright protection systems, the following technique is used. That is, a data processing/calculation program (to be referred to as a content code hereinafter) required to execute a content security policy and decryption processing is provided together with a content. As player specifications, a virtual machine which processes the content code is specified, so that at least some processes of player-dependent security processing, which is normally uniformly specified in the copyright protection system, are specified as updatable systems.

However, even when the additional content protection is applied, once a code execution environment, and the structures of a content code and virtual machine are exposed from a vulnerable device, effects of security obtained by updating content protection processing disappear in all environments. On the other hand, when all unique individual specifications are adopted without specifying any virtual machine structure, a content code has to be created after the processing environment of the apparatus is fully recognized, resulting in poor productivity and compatibility.

An embodiment will be described hereinafter with reference to the drawings. Note that common reference numerals denote, common parts throughout the drawings in this description.

COMPARATIVE EXAMPLE

A comparative example will be described below using FIGS. 1, 2, and 3 for the purpose of comparison with an embodiment to be described later.

<Content Protection of AACS System>

FIG. 1 shows an AACS content protection sequence used in, for example, read-only Blu-Ray Discs.

As shown in FIG. 1, a disc manufacturer 100 is provided with, for example, an MKB (Media Key Block) generated using a device key group based on media keys, media keys (Km), and KCD (Key Conversion Data), which are used in content encryption, from a copyright protection management organization. The disc manufacturer 100 receives, for example, a content and title key (Kt) from a content copyright holder, and encrypts the content using Kt as an encryption key.

Furthermore, Kt is encrypted by a volume unique key generated by AES-G processing from the media keys and a volume ID, thus generating a title key file including the encrypted Kt. Note that the AES-G processing is unidirectional function processing based on AES encryption. The volume ID is a title volume unique value generated by the disc manufacturer 100 or the content copyright holder.

At designated locations of a medium 200, "MKB", "KCD", "volume ID", "title key", and "encrypted content", which are acquired or processed/generated by the disc manufacturer 100, are recorded. After that, the medium 200 is supplied to the market together with the stored data. Note that the medium 200 is not limited to a disc-shaped disc, but may be an arbitrary physical storage medium such as an SD (Secure Digital) card.

A player 300 executes decryption processing based on the recorded data read out from the medium 200, and plays back the content. In the player 300, device keys, which are provided from the copyright protection management organization, are held in a form which is difficult to be exposed and falsified. The player 300 reads out the MKB from the medium 200, and executes MKB processing (Process MKB) using the device keys, thereby deriving media keys. In this case, depending on the types of device keys held by the player 300, different values are derived as a result of the MKB processing. In the AACS, players are classified into two categories: one category is called "Enhanced Robustness Device", and the other is called "Proactive Renewal Device". The former device indicates a player in which secret data such as device keys are securely protected by, for example, hardware. The latter device indicates a player which is represented by software that runs on an open platform such as a PC, and has a requirement to periodically update device keys in place of the hardware-based protection of the device keys. In case of the former device, media keys are derived by applying the KCD and AES-G processing to values derived by the MKB processing. In case of the latter device, values themselves derived by the MKB processing are used as media keys. By applying the AES-G processing to the Media keys derived in this way using the volume ID, a volume unique key is derived. A title key in the title key file is decrypted by the volume unique key, and the content is then decrypted by the title key.

As can be seen from the above description, device keys as a basis of encryption and decryption are very important secret data. Hence, in case of leakage of a device key, a structure that allows to invalidate a device key is applied to the MKB. The MKB is configured by encrypted media keys obtained by respectively encrypting a plurality of media key copy data by a plurality of device keys. If a certain device key is leaked, and is used to illicitly copy a content, the content can be prevented from being decrypted using the leaked device key by removing a media key encrypted by the leaked device key from the MKB. This is called invalidation or revocation of a device key. However, this invalidation information can be applied to only newly manufactured media, but it cannot be applied to previously manufactured and sold media.

<Key Invalidation by MKB Structure>

Key invalidation using the MKB will be described below using FIG. 2. The MKB used in the AACS has a tree structure called "NNL Tree", and device keys (Kd1, Kd2, Kd3, . . . ) exist on respective leaves. Media keys (Km) are respectively encrypted by the device keys corresponding to the leaves, and are assigned to the corresponding leaves of the MKB. Based on this structure, pieces of information such as the encrypted device keys corresponding to the leaves and node numbers of leaf device keys are stored in an MKB file. If a device key corresponding to leaf 2 is to be invalidated, the encrypted media key corresponding to that leaf can be excluded from the MKB.

<Key Invalidation by SKB Structure>

FIG. 3 shows another MKB structure (SKB (Sequence Key Block) structure). In FIG. 2 above, data based on an identical media key are assigned to all leaves. However, in the SKB structure shown in FIG. 3, different media keys called media key variants (Kmv) are assigned to the respective leaves. This structure is used for a use purpose such as individualization of media keys acquired for respective devices required to differ subsequent encryption processing. In the AACS system, a part of a content is copied, and respective copied contents are encrypted using keys based on different media key variants to differ playable contents for respective devices. Hence, this structure is used to specify a device upon leakage of a device key.

In this way, in the AACS system, when a device key is leaked, a means for specifying the device key and a means for invalidating the device key are taken. However, when a vulnerable player or route happens, a plurality of device keys are leaked via a plurality of players and other routes, and illicit copies of contents may be continued using other device keys if that device key is invalidated.

[First Embodiment]

A protection method, decryption method, player, storage medium, and encryption apparatus of a digital content according to the first embodiment will be described hereinafter using FIGS. 4, 5, 6, 7, 8, 9, 10, 11, 12, 13, 14, 15, 16, 17A, 17B, and 18. In the following description, a detailed description of portions redundant to those in the comparative example will not be given.

<0. Precondition (SPDC System)>

As the precondition, a content protection technique based on an SPDC (Self-Protecting Digital Content) system will be described first. The SPDC system is a technique that changes and updates the content protection system itself as a content illicit usage measure in addition to the aforementioned key invalidation. For example, according to the SPDC technique, as a storage medium, by providing a data processing/calculation program (to be referred to as a content code hereinafter) required to execute a content security policy and decryption processing together with an encrypted content, a system that can update player-dependent security processing can be provided. In the SPDC, a part of content protection processing is implemented by the content code which runs on a virtual machine in a player. In this case, the virtual machine generally means an architecture which defines a computer that virtualizes resources such as a CPU and storage device of a computer, and is required to execute the virtual computer.

The virtual machine receives an intermediate language (also called a byte code) which falls between a hardware-dependent machine language and an advanced programming language such as C, and interprets the intermediate language into the machine language by an interpreter in the virtual machine, thus allowing CPUs and storage devices having different machine language formats to execute the same program. The virtual machine includes a virtual processor and virtual memory, and provides, for example, an access function to resources in a player and those in a disc in addition to execution of arithmetic and encryption calculations.

<1. Arrangement Example>

1-1. Player

A player which adopts the SPDC technique using the virtual machine according to this embodiment will be described below using FIG. 4.

As shown in FIG. 4, the player according to this embodiment includes a virtual machine 30, which is partitioned by a player boundary 10 indicated by a broken line in FIG. 4, and is configured by a processor 12, interpreter 17, and execution & data RAM 18. Details of the virtual machine 30 will be described later.

The processor 12 reads out, for example, playback environment configuration data (Playback Environ. Config.) 11 configured by environment/setting information unique to the player, and controls the operation of the overall player.

For example, the playback process is controlled by processor 12, which can access a storage medium 25 via a media interface 15. When the storage medium 25 is mounted, the processor 12 begins initialization process and reads out the storage media's table of contents.

The interpreter 17 is mounted based on an interpretation method from an intermediate language into a machine language. The interpreter 17 includes instruction tables 19 including a common instruction table and individual instruction tables. Details of the instruction tables 19 will be described later.

The execution & data RAM 18 is capable of storing a content code 29 and the encrypted content read out from the storage medium 25 via the media interface 15. The interpreter 17 executes predetermined processing using the content code 29 loaded into the RAM 18 and the instruction tables 19 when the storage medium 25 was mounted.

A BULK decryption module 13 receives, from the processor 12, designations of an authentic decryption key and parameters for, for example, the encrypted content or encryption key information read out from the storage medium 25. The BULK decryption module 13 retrieves the encrypted content from the RAM 18 or, alternatively, directly from the media interface 15 and decrypts the encrypted content.

Cryptographic oracles 14 give the processor 12 an evidence which is held by the cryptographic oracles themselves or allows a content imprinted in a detachable external security card 24 to authenticate a certification that this player is an authentic device, information such as an encryption key read out from the medium 25, or the processing result of the information such as the encryption key by the cryptographic oracles 14. The security card (SIM) 24 is, for example, a smart card.

The media interface 15 reads out a content code 29 and the encrypted content from the storage medium 25, and loads them onto the RAM 18 in the virtual machine 30. In this way, the storage medium (Media) 25 records the content code 29 which is described according to a security policy for each content.

An output interface 16 supplies a content processed by the processor 12 or BULK decryption module 13 to a destination program/device 26 which intends to render, record, or play back the content.

The virtual machine 30 sequentially reads out instructions described in the content code 29, interprets them into those in a machine language to execute these instructions. In this case, the virtual machine 30 has, for example, a function of accessing environment/setting information unique to the player, a function of accessing information and functions associated with encryption processing which is recorded in the RAM 18 in the player or an external medium such as the SIM card 24, and a function of executing control and processing of a decryption processing module. Instruction description rules required to use these functions are defined in advance, and the implementation of the virtual machine 30 and the description of the content code 29 are made according to the definitions.

With the above arrangement, content protection processing, which is uniform so far, can be expanded to protection processes for respective contents by the content code 29. For example, unlike the CSS of DVDs, a situation in that a content protection structure is fully exposed, and all countermeasures cannot be taken can be avoided by the expandable protection processing. Then, in addition to the feature that the content protection processing itself can be changed, processes can be executed according to environments of players. For example, additional processing is provided to a player from which a key is leaked. Also, a content can be individuated by appending different watermarks to respective players.

However, even the content protection technique based on the SPDC system tends to have no countermeasure to be taken when the structure of the virtual machine 30 is exposed. Exposure of the structure of the virtual machine 30 means to allow an illicit user to build an environment in which the content code 29 that describes the content protection processing can be executed, and also to allow that user to interpret, grasp, and execute the processing contents of the content code 29. Also, as for processing according to a player, a means that can avoid this, and a fake response of a player environment can be carried out. That is, in the content protection processing based on a program using the virtual machine 30, the secrecy of the structure of the virtual machine 30 is very important.

As described above, in terms of content protection, upon introducing updatable content protection processing like the SPDC system, the secrecy of the structure of the virtual machine 30 is important. On the other hand, in terms of improvement of productivity and compatibility, compatibility between a content and player has to be guaranteed, a format of the content itself, a content protection format, a content code format, device specifications, and so forth are standardized, and content producers and device manufacturers have to share the specifications. Normally, these standardizations and standard specifications are formulated by a standard specification formulation organization, and the standard specification formulation organization provides required pieces of information including specifications and data to the content producers and device manufacturers. These pieces of information such as the specifications and data include, for example, information such as the aforementioned key information and virtual machine structure, which require secrecy, and are handled as a global secret. Hence, upon disclosing the technical specifications of the virtual machine, confidentiality of these pieces of information equivalent to or more than key information has to be concluded between the standard specification formulation organization as a disclosure source and a disclosure destination. Elements as clues when an illicit user interprets the virtual machine structure include the content code itself and a device which installs the virtual machine, and a measure that prevents the contents of them from being easily exposed has to be taken.

However, even when the aforementioned measures are taken, the possibility of the exposure of the structures of the virtual machine and content code cannot be denied. As for key information which is required to similarly have secrecy, the invalidation means at the time of leakage is taken, as descried above. On the other hand, as for the virtual machine 30, no effective invalidation means tends to be taken. This is because the same virtual machine specifications are used to achieve compatibility of the content code. When the specifications are invalidated, all players manufactured based on the specifications are invalidated.

For this reason, when the virtual machine structure is unwantedly grasped from a certain vulnerable device, the influence is spread to all other devices which adopt the same virtual machine structure. There is no countermeasure against this, and the content protection system itself using the virtual machine is invalidated.

Thus, a method and arrangement which are advantageous in terms of enhancement of content protection and improvement of productivity and compatibility by individuating at least some processes of the virtual machine for respective devices or device groups, so as to prevent the interpreted contents from a vulnerable device from being applied to other devices will be described in more detail below.

1-2. Arrangement Example of Virtual Machine

An example of the internal structure of the virtual machine 30 according to this embodiment will be described below using FIG. 5.

As shown in FIG. 5, the virtual machine 30 is implemented by hardware, software, or their combination inside a player 10.

The content code 29 is supplied to the player 10 via, for example, a storage inside or outside the device or a communication device. The content code 29 includes, for example, an instruction set (to be described later) which can be interpreted by the player 10 (virtual machine 30) and data processed by the instruction set.

A memory 31 holds the content code 29. In this case, the memory 31 may be either a volatile memory or nonvolatile memory.

An instruction loader 32 calls instructions and data in the content code 29 held in the memory 31. Respective instructions called by the instruction loader 32 may have a format which can be interpreted intact by an instruction processor or that which can be interpreted by an instruction processor 35 after they are converted by an instruction converter 34 shown in FIG. 5.

A register 33 holds, for example, values used in calculations, values as calculation results, and address values (program counter) of next instructions to be executed in the content code 29 held in the memory 31. The register 33 is accessed from the instruction loader 32 and a system call operation 36 (to be described later) in addition to the instruction processor 35. Note that this embodiment describes the register 33 as a module independent of the memory 31. However, in practice, a part of the memory 31 may be used as a register.

The instruction converter 34 is used to obfuscate the content code 29 and its execution environment, and has a function of calculating values held in the register 33 or the memory 31 upon loading instructions and those of the loaded instructions to convert the instructions into a format which can be interpreted by the instruction processor 34. In this case, the addresses of the register 33 or memory 31 where the values used in the calculations are held may be fixed addresses, which are set in advance, or may be indicated by values included in the loaded instructions or those which are held in a predetermined area of the register 33 or memory 31. A calculation method may be any of a bit calculation, arithmetic calculation, and cryptographic calculation. Either one or a plurality of values may be used in the calculations.

The instruction processor 35 receives instructions called by the instruction loader 32 or those which are converted by the instruction converter 34. The instruction processor 35 interprets opcodes of respective instructions into execution functions using the instruction tables (opcode-function) 19. The instruction tables 19 may be hardwired, may be recorded in an EEPROM (Electrically Erasable and Programmable Read Only Memory), or may be recorded in a storage area outside the virtual machine 30 as data. The instruction processor 35 uses the register 33 as a storage area upon execution of processes based on opcodes.

The system call operation 36 is used based on respective instructions by a cryptographic function, usage control function, media access function, and other module access functions included in the virtual machine 30 or the player 10 indicated by the player boundary shown in FIG. 4. These functions are used when the instruction processor 35 issues system calls required to call the respective functions included in the virtual machine 30. Input/output exchange processes associated with execution of the system call operation 36 use the aforementioned register 33 and memory 31.

A crypt module 41 may include, for example, unique information, an encryption key, decryption key, signing key, and certificate, which are used in cryptographic calculations separately held by the player in addition to calculations based on a cipher machine such as encryption, decryption, random number generation, unidirectional functions, and signature processing. The crypt module 41 may be an interface which does not include any of the aforementioned calculations or unique information, and uses external functions of the virtual machine 30 such as the BULK decryption module 13 or cryptographic oracles 14 in FIG. 4.

A usage control 42 may include control associated with content usage such as assignment of copy control information, analog copy guard information represented by Macrovision, and digital copy guard information represented by HDCP (High-bandwidth Digital Content Protection system) or DTCP (Digital Transmission Content Protection) at a play start timing, stop timing, or signal output timing to a display or other external devices. The usage control 42 may be an interface which does not include the aforementioned control information or control function by itself, and uses external functions of the virtual machine 30 such as the destination program/device 26 in FIG. 4.

A media interface 43 is an access interface for a medium which records a content and information associated with the content. The medium may be a removable medium, an internal medium of the player, or a medium on an external device. The media interface 43 may be an interface which does not include the aforementioned access function by itself, and uses external functions of the virtual machine 30 such as the media interface 15 and storage medium 25 in FIG. 4.

A module interface 44 includes function modules other than those described above, for example, a content decoder, device internal clock, network interface, USB interface, SIM card for a mobile phone, and credit card. The module interface 44 indicates internal function modules of the player or those of an external device which can be used via the interfaces of the player.

1-3. Instruction Set

An instruction set 39 according to this embodiment shown in FIG. 5 will be described below using FIG. 6.

FIG. 6 shows an example of the instruction set 39 according to this embodiment. The instruction set 39 includes opcodes (0x01, 0x02, 0x03, etc.) indicating instruction words corresponding to the system call operation 36 in addition to data load instructions for the memory 31 and register 33, arithmetic operation instructions such as addition, subtraction, multiplication, and division, bit calculation instructions such as AND/OR/XOR/Shift. An opcode indicating the system call operation 36 is used together with an argument which is stored in a specific area on the register 33 or memory 31 or is included in an instruction, or a code set which is specified for each system call operation, and is stored at an address in the register 33 or memory indicated by the argument.

1-4. Instruction Format

An example of an instruction format according to this embodiment will be described below using FIG. 7.

Figure 7:
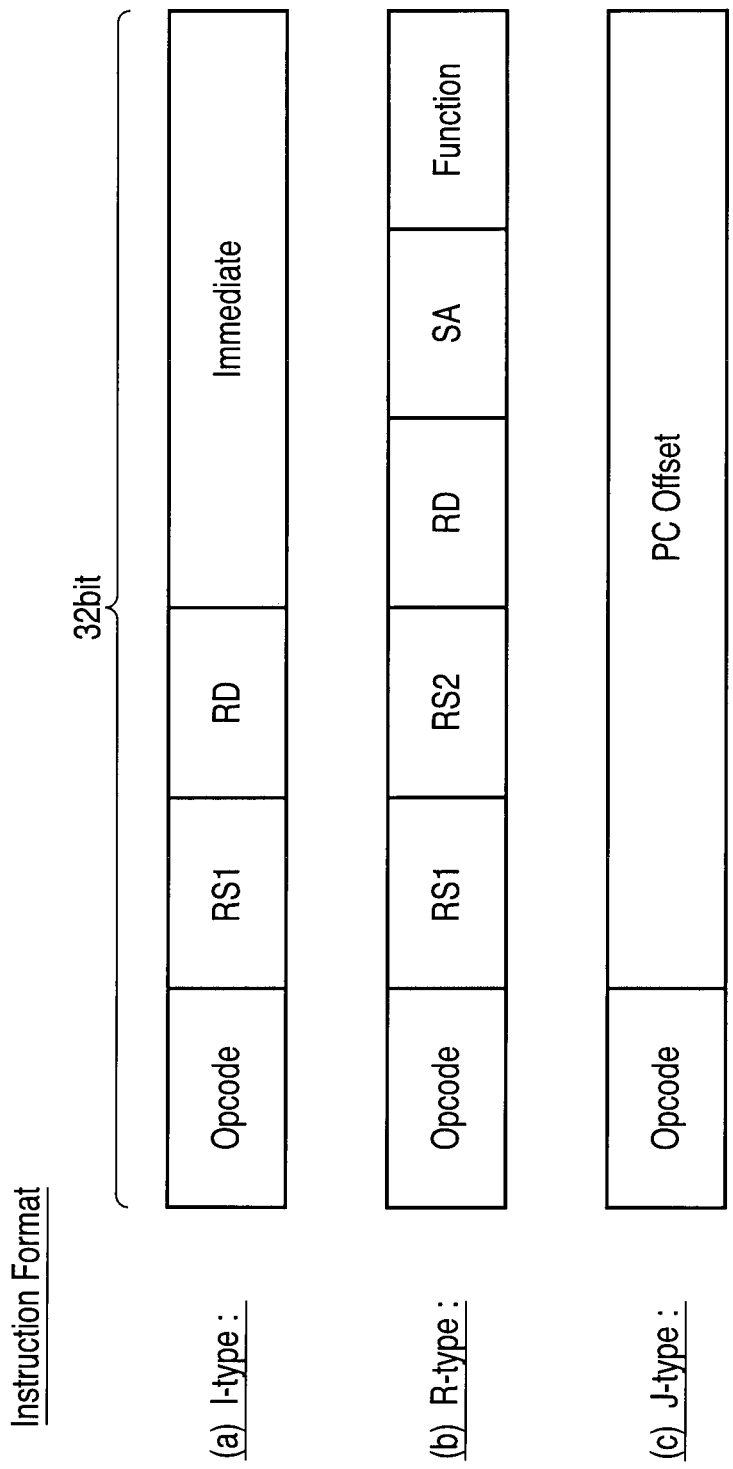
FIG. 7 shows an instruction format according to the first embodiment.

As shown in FIG. 7, in the instruction format, respective instructions include data indicating, for example, "RS1", "RS2", "RD", "SA", "Immediate", "Function", and "PC Offset" together with the aforementioned opcodes.

(a) shows 32-bit I-type. "RS1" in (a) means an address of the register 33 or memory 33 which stores a variable used in an operation. "RD" means an address of the register 33 or memory 31 which stores a value of an operation result. This is an example using a format used in, for example, a DLX processor. "Immediate" is an area which stores not a value stored in the register 33 but an immediate value (directly designated variable) used in an operation.

(b) shows 32-bit R-type. "RS2" in (b) similarly means an address of the register 33 or memory 31 which stores a variable used in an operation. "RD" is "RD" is an address of the register 33 or memory 31 which stores a value of an operation result. "SA" is a spare area for an arbitrary purpose. "Function" is an expanded function area which is specified as needed for each opcode for a designation or usage of an additional input/output or another expanded function.

(c) shows 32-bit J-type. "PC Offset" is an area for holding an address of a program counter used upon jumping to a specific instruction, contrary to normal sequential execution of an instruction sequence. The address of the program counter may be either an absolute address or relative address.

The content code 29 is configured by, for example, the instruction set 39 including the aforementioned system call operation 36 and data processed and used by the instruction set. In this way, by implementing further calculation processes and conditional branch processes based on usage of respective player functions and their return values via the system call operation 36 in addition to data calculations using the content code 29, advanced and obfuscated security processing can be implemented.

As described above, when all devices adopt an identical virtual machine structure, if the virtual machine structure is grasped from a certain vulnerable player, the influence tends to be spread to all other players which adopt the similar virtual machine structure. On the other hand, when a virtual machine is not specified, and all players have unique specifications, content codes have to be generated after the player processing environments are fully grasped, and the productivity and compatibility tend to deteriorate.

Hence, the method and arrangement which can prevent the productivity and compatibility from deteriorating while enhancing content protection by individuating the structure of the virtual machine 30 will be described in more detail below.

1-5. Instruction Tables

Examples of the instruction tables according to this embodiment, which are applied to the method and arrangement, will be described below using FIG. 8.

FIG. 8 shows examples of (a) a common instruction table 19-0, and (b) individual instruction tables (instruction tables #1 to #3) 19-1 to 19-3, which have different functional assignments from those of opcodes in the instruction set.

The common instruction table 19-0 in (a) is an instruction table common to respective players. In this way, when the respective players use the common instruction table 19-0 as a common content code, it is advantageous in reduction of the information volume and improvement of the productivity and compatibility.

The individual instruction tables (instruction tables #1 to #3) 19-1 to 19-3 in (b) are instruction tables in which at least some elements of an instruction table, which indicates the assignment relationship between opcodes and functions of the instruction set, are individuated for respective players or player groups. The player group means, for example, a group of players which belong to a certain model name or a group of players which belong to a certain manufacturer name.

For example, table #1 uses a sequence indicated by X(i), X(i+1), X(i+2), . . . as opcodes. Table #2 uses a sequence indicated by Y(i), Y(i+1), Y(i+2), . . . as opcodes. Table #3 uses a sequence indicated by Z(i), Z(i+1), Z(i+2), . . . as opcodes. In this case, X, Y, and Z sequences are different data indicator sequences. In this manner, by applying the different individuated instruction tables 19-1 to 19-3 for respective players or respective player groups, even when a player, which installs, for example, table #1 suffers vulnerability, and the contents of table #1 are exposed, the influence is not spread to player groups using other tables #2 and #3, thus providing an advantage in enhancement of content protection.

As described above, in the instruction tables 19 according to this embodiment, in order to individuate the virtual machine 30 by the individual instruction tables (instruction tables #1 to #3) 19-1 to 19-3, the content codes have to be prepared for respective virtual machines 30 and have to be distributed and recorded together with a content. However, since the common instruction table 19-0 provides a common content code, the information volume is reduced.

Figure 9:
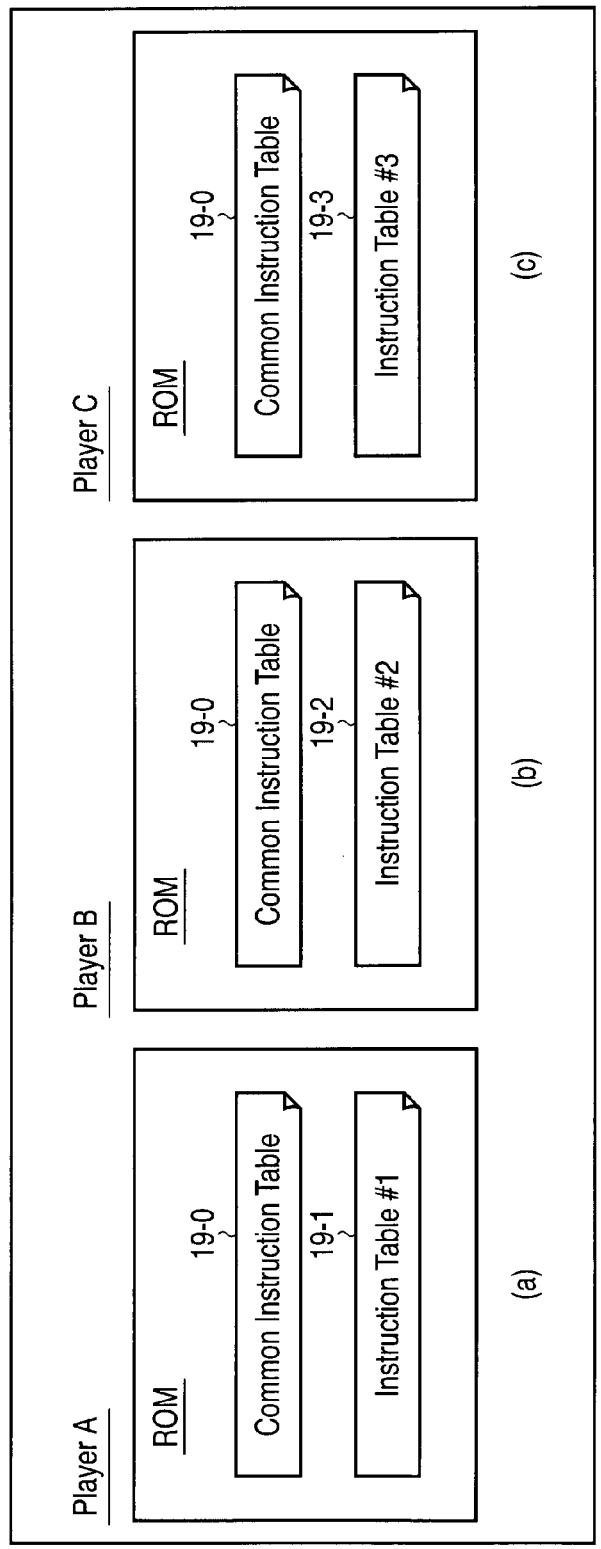
FIG. 9 shows examples of players which store the instruction tables according to the first embodiment.

As a result, respective players each having the virtual machine 30 store tables, as shown in FIG. 9. The tables are stored in, for example, a ROM (Read Only Memory) in each player.

Player A shown in (a) stores the common instruction table 19-0 and individual instruction table (instruction table #1) 19-1 in its ROM.

Player B shown in (b) stores the common instruction table 19-0 and individual instruction table (instruction table #2) 19-2 in its ROM.

Player C shown in (c) stores the common instruction table 19-0 and individual instruction table (instruction table #3) 19-3 in its ROM.

Note that the present invention is not limited to this specific example, and individual instruction tables (instruction tables

4, #5, ... ) may be further stored as needed. For example, different individual instruction tables may be stored for respective content player groups as needed (for example, a first group {player A, player B}: the individual instruction table 19-1, a second group {player C}: the individual instruction table 19-2).

<2. Content Code Generation Method>

A generation method of the content code 29 according to this embodiment will be described below using FIGS. 10, 11, 12, 13, 14, and 15. The content code generation method is executed by a dedicated write apparatus (encryption apparatus) on the disc manufacturer 100 side.

Compilers convert each source code into content codes (C0 to C#n) based on the common instruction table 19-0 and individual instruction table (instruction table #n) 19-n assigned to each player or player group. A content code (common code: C0) compiled based on the common instruction table 19-0 will be referred to as a common content code hereinafter, and a content code compiled based on the individual instruction table (instruction table #n) 19-n will be referred to as an individual content code (code #n) hereinafter.

The source code describes a processing sequence which is executed by a player according to a security policy of a content. Each complier also executes conversion processing for the processing in the aforementioned instruction converter 34 upon conversion of a source code into a content code. The generated content code 29 undergoes processing such as encryption and packaging required for distribution or recording as needed in addition to signature processing. In this case, the signature processing is required to prevent the content code 29 created by an illicit user from being executed, and the player verifies a signature before execution of the content code 29, thus determining whether or not the content code 29 is an illicit content code or whether or not the content code is falsified. Hence, the player can prevent a content code other than an authentic one from being executed. In this case, the signature processing may be implemented by a method of generating a signature using a private key and verifying it using a public key based on a public key cryptosystem such as RSA and ECDSA, and also a method of generating a message authentication code (MAC) using a private key and verifying the MAC using the same private key based on a symmetric-key cryptosystem such as AES (Advanced Encryption Standard). The latter private key may use program keys (to be described later) prepared for each content code 29.

2-1. Example of Common Code Generation (when No Hacking Occurs)

Figure 10:
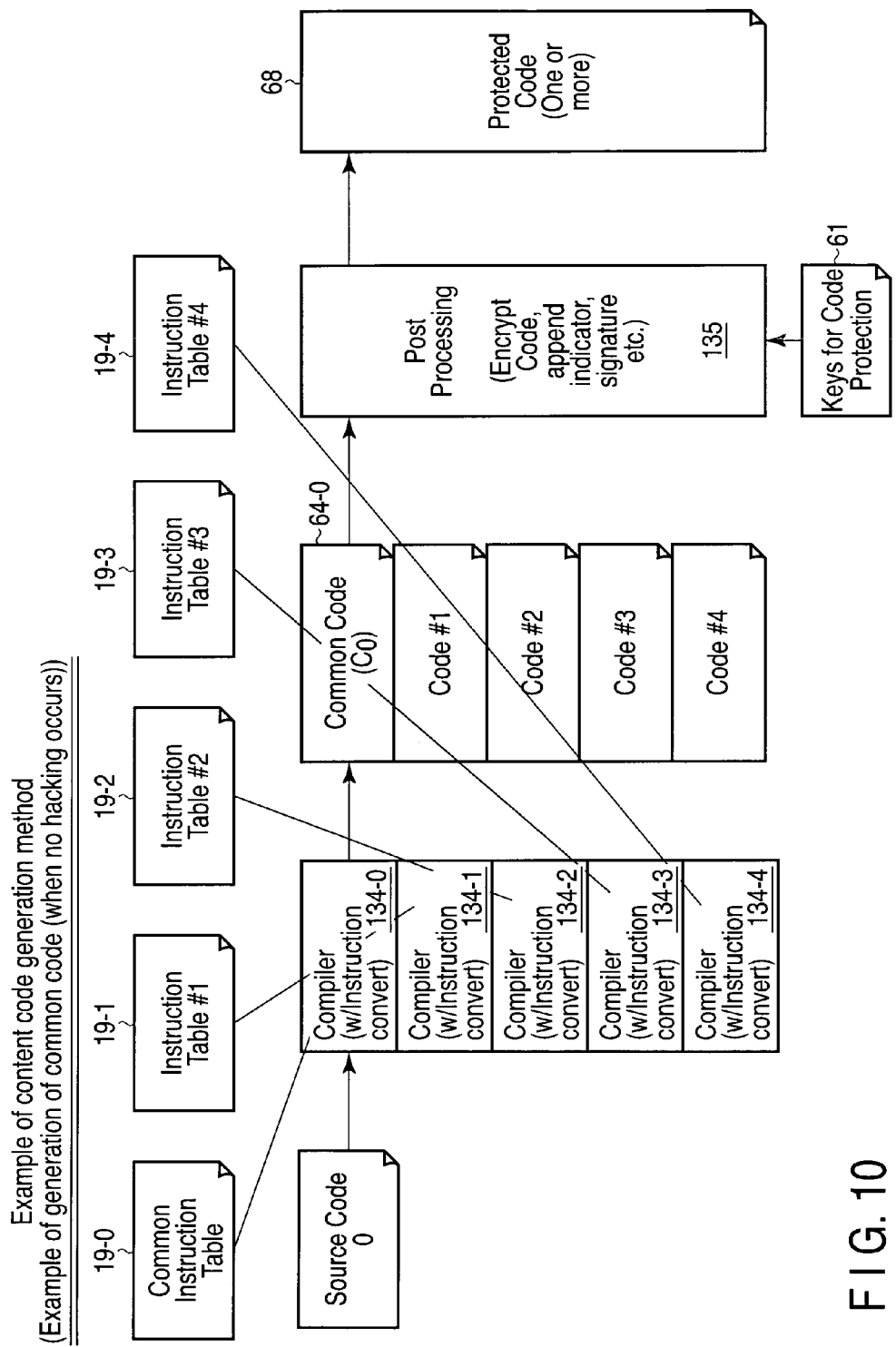
FIG. 10 is a chart showing one generation method of a content code according to the first embodiment.

FIG. 10 shows an example when all the players are controlled to execute common processing, and a source code is compiled using the common instruction table 19-0. This case corresponds to, for example, a case in which no hacking occurs in all players and, hence, all the players are controlled to execute processing according to a common security policy using only the common instruction table 19-0.

As shown in FIG. 10, a corresponding complier (w/instruction convert) 134-0 converts a source code (source code 0) into a common content code (common code (C0)) 64-0 based on the common instruction table 19-0.

Subsequently, a post processing unit 135 processes the common content code (common code (C0)) 64-0 into a protected code 68 to have keys 61 for code protection as private keys. Note that the keys 61 for code protection are those which include program keys (to be described later) or a signing key as needed.

2-2. Example of Individual Code Generation (when Common Instruction Table has been Hacked)

Figure 11:
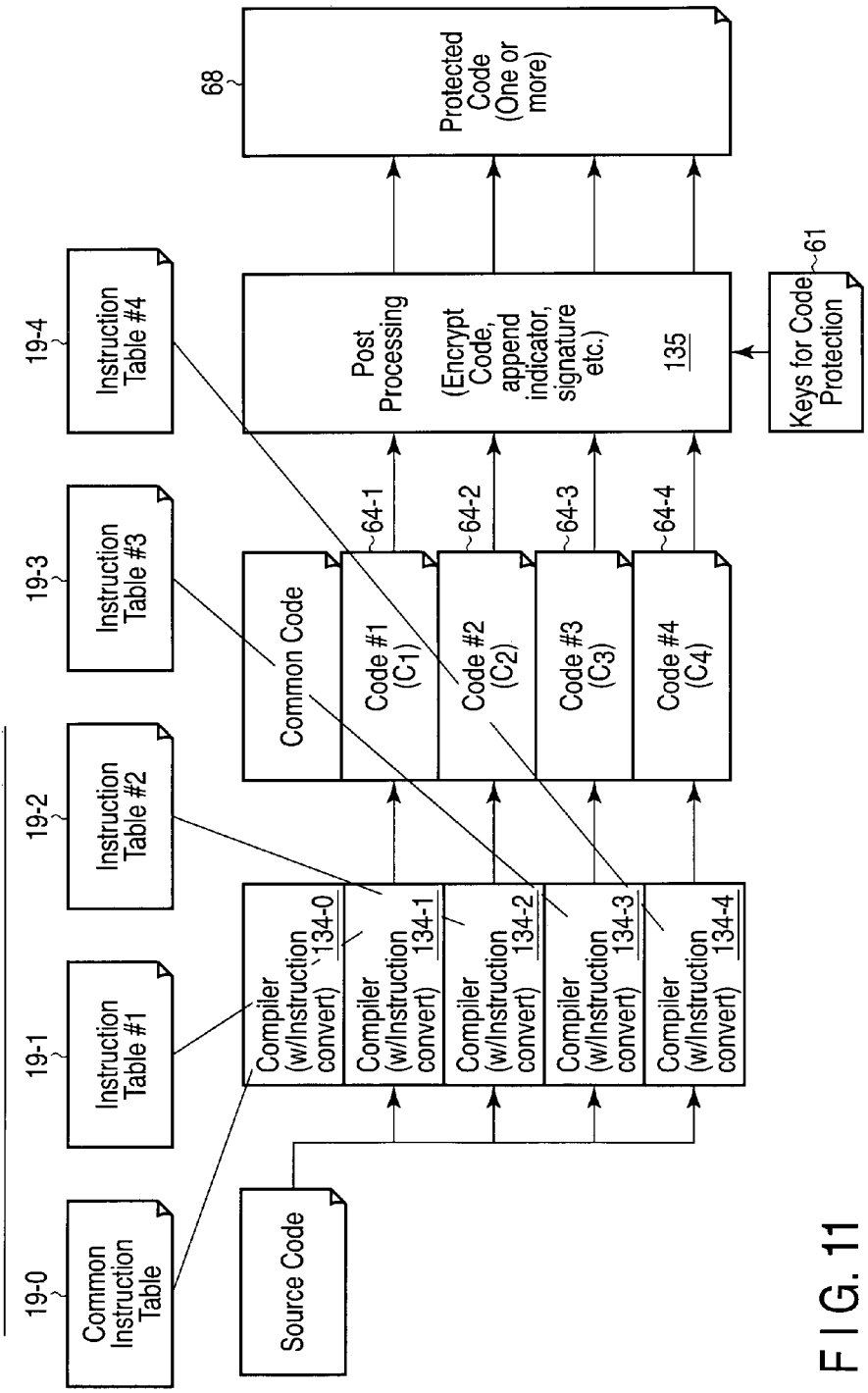
FIG. 11 is a chart showing one generation method of a content code according to the first embodiment.

FIG. 11 shows an example in which all the players are controlled to execute common processing but a source code is compiled using different individual instruction tables (instruction tables #n) for respective players. For example, this case corresponds to a case in which the common instruction table 19-0 has been hacked, and all the players are controlled to execute processing according to a common security policy.

As shown in FIG. 11, for example, when the common instruction table 19-0 has been hacked, no common content code 64-0 in the above case 2-1 is generated, and a source code begins to be compiled using the individual instruction tables (instruction tables #n).

That is, corresponding individual compilers (w/instruction convert) 134-1 to 134-4 convert a common source code into individual content codes (codes #1 to #4) 64-1 to 64-4 based on the individual instruction tables (instruction tables #1 to #4) 19-1 to 19-4.

Subsequently, the post processing unit 135 processes the individual content codes (codes #1 to #4) 64-1 to 64-4 into protected codes 68 similarly using the keys 61 for code protection as private keys.

2-3. Example of Specific Code Generation

Figure 12:
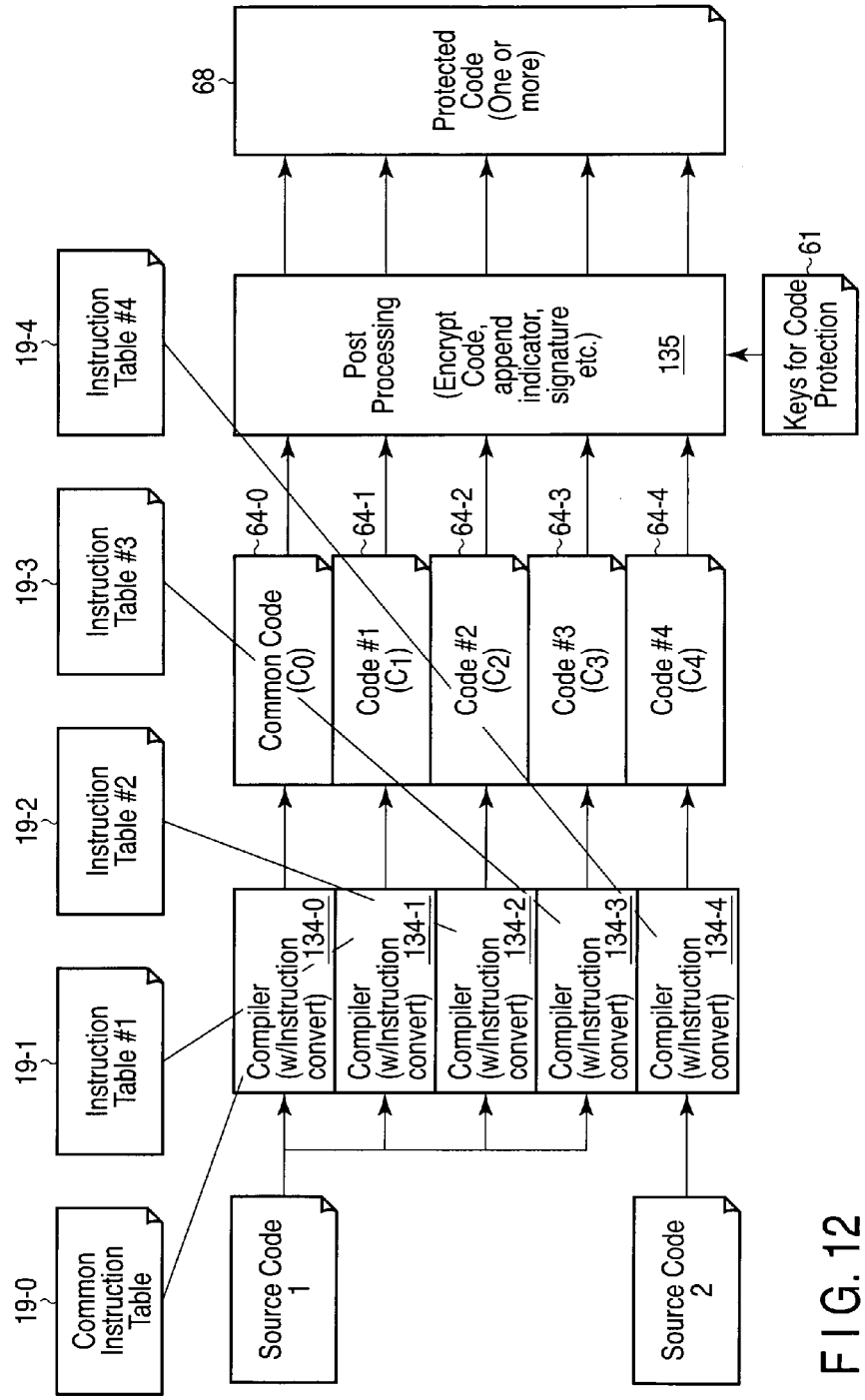
FIG. 12 is a chart showing the control sequence of a 2-column mode (2) of a semiconductor storage device according to the first embodiment.

FIG. 12 shows an example in which a specific player (in this case, a player corresponding to instruction table #4) is controlled to execute different processing, and a source code is compiled using different instruction tables for respective players. For example, this processing is used when a player which executes processing based on instruction table #4 is suspected of hacking, and hacking status inspection via the system call operation 36, selection/stop of key derivation processing based on the inspection result, content playback control, and so forth can be executed for only that player.

That is, a corresponding individual compiler (w/instruction convert) 134-4 converts source code 2 into an individual content code (code #4) 64-4 based on the individual instruction table (instruction table #4) 19-4.

Subsequently, the post processing unit 135 processes the individual content code (code #4) 64-4 into a protected code 68 similarly using the keys 61 for code protection.

2-4. When Source Code 2 is Processed after Processing of Source Code 1

Figure 13:
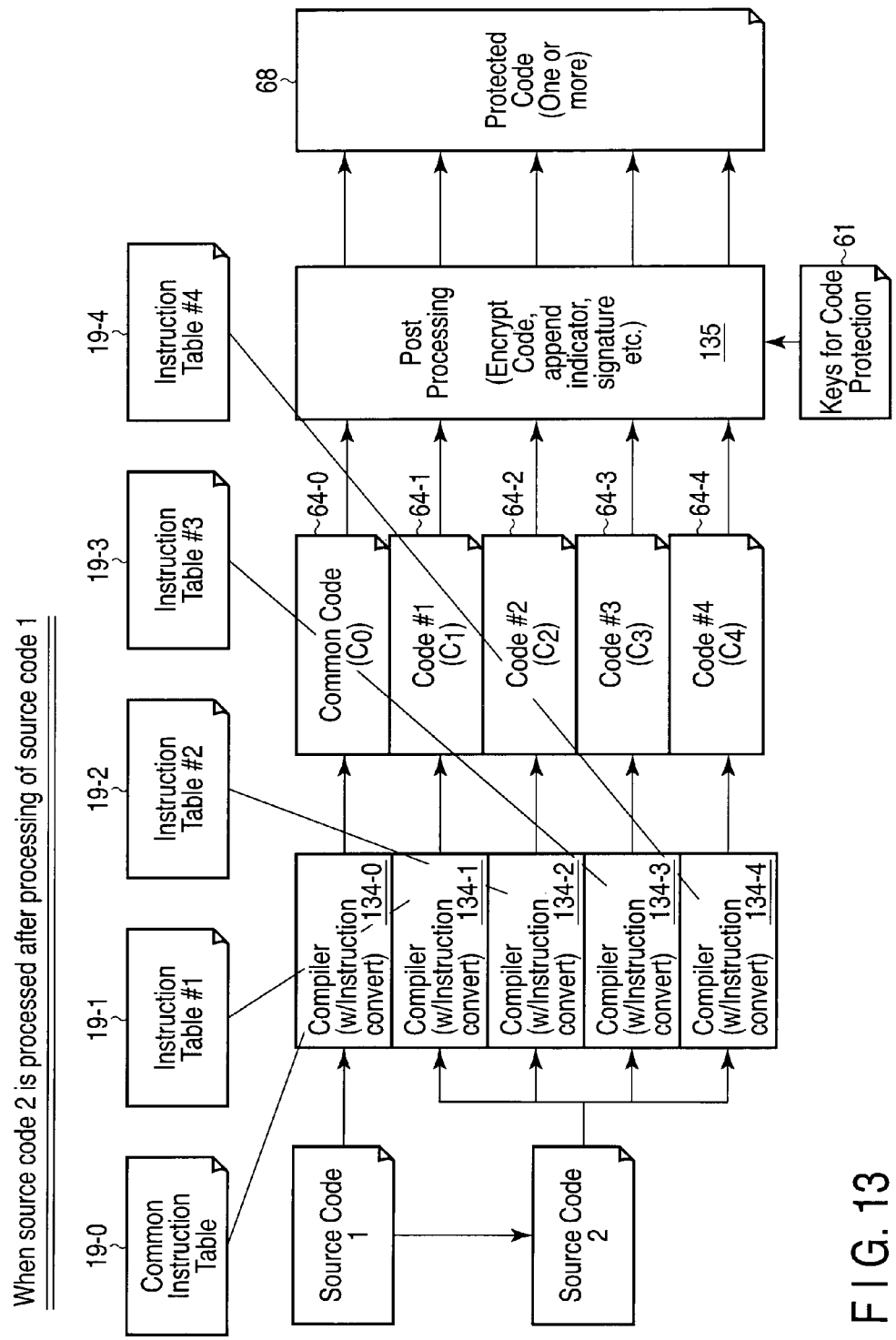
FIG. 13 is a chart showing one generation method of a content code according to the first embodiment.

FIG. 13 shows an example in which all the players are controlled to execute common processing to compile source code 1 using the common instruction table 19-0, and to then compile source code 2 using the different individual instruction tables (instruction tables #1 to #4) for respective players, that is, two content codes are combined. For example, this case corresponds to a case in which the common instruction table 19-0 is not hacked at the time of code generation, but at least some processes are included in codes compiled using the different instruction tables 19-1 to 19-4 for respective players under the assumption that hacking will occur in the future. In this case, it becomes difficult to recognize the overall processing by only hacking of the common instruction table 19-0. For example, this corresponds to a case in which a branch instruction which executes source code 2 after execution of source code 1 is included.

That is, as in the above case, the corresponding compiler (w/instruction convert) 134-0 converts source code 1 into common content code (common code (C0)) 64-0 based on the common instruction table 19-0. Subsequently, the post processing unit 135 processes the common content code (common code (C0)) 64-0 into a protected code 68 using the keys for code protection as private keys.

Then, the individual compilers (w/instruction convert) 134-1 to 134-4 convert source code 2 into individual content codes (codes #1 to #4) 64-1 to 64-4 based on the individual instruction tables (instruction tables #1 to #4) 19-1 to 19-4. Subsequently, the post processing unit 135 processes the individual content codes (codes #1 to #4) 64-1 to 64-4 into protected codes 68 similarly using the keys for code protection as private keys.

Figure 14:
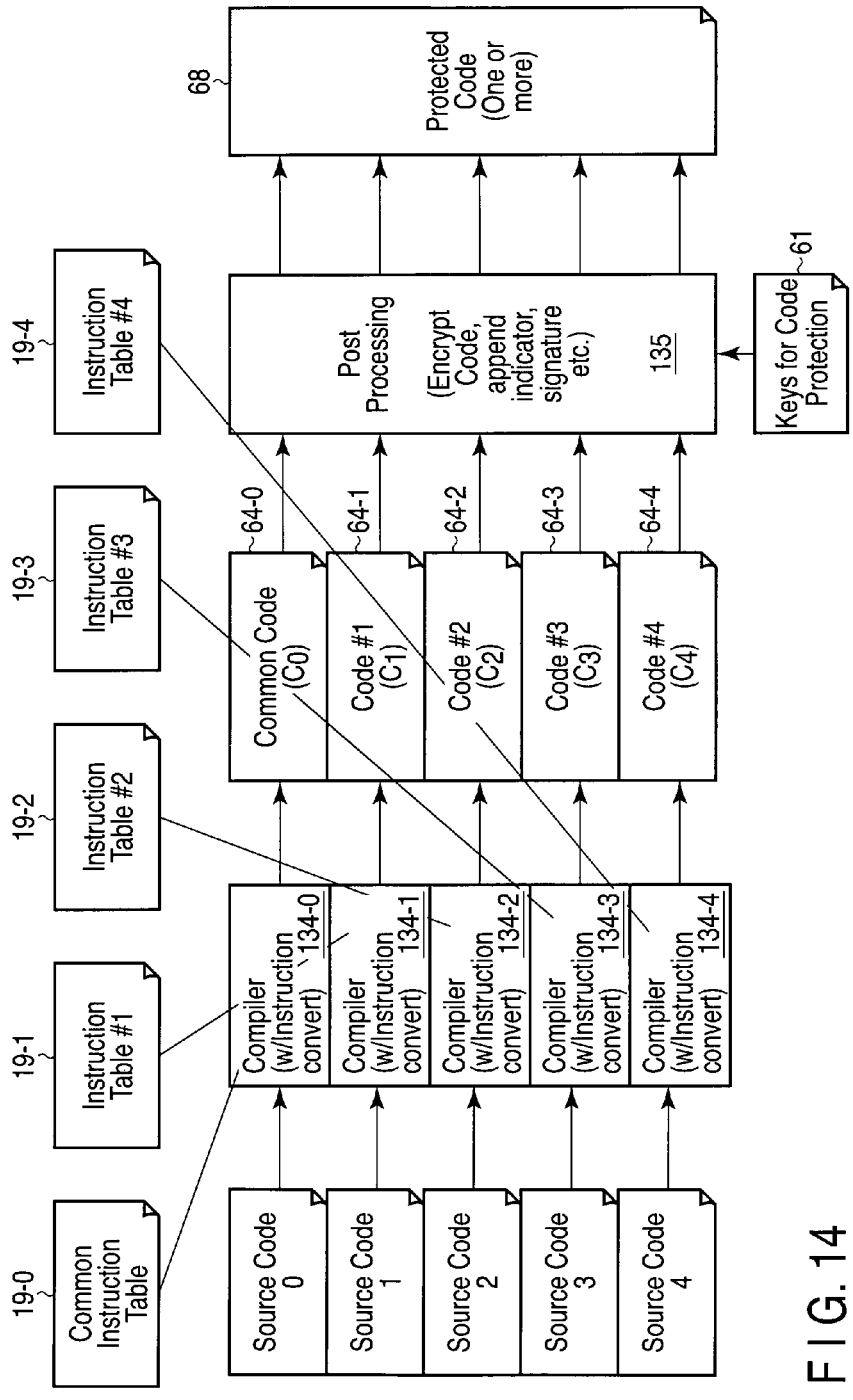
FIG. 14 is a chart showing one generation method of a content code according to the first embodiment.

2-5. When Individual Processing is Executed for Each Player after Common Processing FIG. 14 is different from the case 2-4 shown in FIG. 13 in that respective players execute different processes (source codes 1 to 4). As a result of such execution, since source codes are different for respective players, it becomes difficult to apply the processing contents exposed as a result of hacking of a specific player to other players.

That is, as in the above case, the corresponding compiler (w/instruction convert) 134-0 converts source code 1 into common content code (common code (C0)) 64-0 based on the common instruction table 19-0. Subsequently, the post processing unit 135 processes the common content code (common code (C0)) 64-0 into a protected code 68 using the keys for code protection as private keys.

Then, the corresponding individual compilers (w/instruction convert) 134-1 to 134-4 convert source codes 1 to 4 (source codes 2 to 4) into individual content codes (codes #1 to #4) 64-1 to 64-4 based on the individual instruction tables (instruction tables #1 to #4) 19-1 to 19-4. Subsequently, the post processing unit 135 processes the individual content codes (codes #1 to #4) 64-1 to 64-4 into protected codes 68 similarly using the keys for code protection as private keys.

2-6. About Program Key

Program keys 61 will be described below using FIG. 15.

As shown in FIG. 15, program keys $K_{P0}$, $K_{P1}$, $K_{P2}$, $K_{P3}$, $K_{P4}$, ... (61-0 to 61-4) are used as ciphers of content codes 64-0 to 64-4.

In this case, the program keys 61-0 to 61-4 may be private keys used in generation of the aforementioned message authentication codes. Also, the program keys 61-0 to 61-4 may be different from each other, at least some keys may be the same, or all the keys may be the same. When different program keys are used, even when a program key is exposed from a vulnerable player and an individual content code for that player is decrypted, since individual content codes for other players cannot be decrypted, and the secrecies of the content code and the virtual machine which processes the content code are not influenced. In this case, the program keys are desirably protected based on a key or data unique to a device. Details will be described later.

<3. Encryption Processing (Digital Content Protection Processing)>

3-1.

Encryption processing (digital content protection processing) according to this embodiment will be described below using FIG. 16. The encryption processing to be described below is executed by a dedicated write apparatus (encryption apparatus) on the provider 100 side who writes a content on media, and includes any of processes shown in FIGS. 10, 11, 12, 13, and 14.

As shown in FIG. 16, the encryption processing according to this embodiment encrypts program keys used in protection of the content code 29 and a content key and other processes using data or a key unique to a device. Finally, a protected program key 67, protected code 68, protected content key 69, and protected content 70 are distributed as a data group which has undergone protection processing to players in the form of electrical delivery or physical media that record them.

(Step P0 (Generating Code (Security Policy, Etc.)))

Based on a source code described based on a security policy and content protection method, the compiler 134 as a content code generator generates a content code (C0, C1, C2, . . . ) 29 like the content code generation methods described in FIGS. 10, 11, 12, 13, and 14. As described in variations of FIGS. 10, 11, 12, 13, and 14, one or a plurality of source codes may be used. Also, one content code may be generated for each source code or a plurality of content codes may be generated while being compiled using different instruction tables.

(Step P1 (Protect Code (w/ or w/c Conv.)))

The generated content code 29 undergoes protection processing by the post processing unit 135 as a content code protector and is processed as a protected code (C0e, C1e, C2e, . . . ) 68. In this case, the program keys 61 are used, as described above. Note that the program keys 61 are associated with information 62 based on device unique values by the protection processing, and a program key 61 corresponding to a content code for the associated player is used in protection of each individual content code. As indicated by a broken line, unique values 71 such as a media ID/key, volume ID/key, content ID/key, and device ID/key may be used in the protection processing. Furthermore, obfuscation corresponding to processing by the aforementioned instruction converter 34 may be executed. The protected content code 68 is distributed to players as an encrypted content in the form of electrical delivery or physical media that record the content, as shown in step P6.

(Step P2 (Protect Program Key))

The program keys (Kpc, Kp1, Kp2, . . . ) used to encrypt the content codes undergo protection processing using, for example, the information 62 based on device unique values. In this case, the information 62 based on the device unique values may directly use the device unique values, and also indirect information derived using the device unique values. As an example of related information, a media key group corresponding to each information 62 based on the device unique values may be used.

As a practical example, media key variants in the aforementioned SKB are indirect information, and device keys required to process the SKB and to derive the media key variants correspond to, for example, device unique information. Also, the indirect information may be derived using the unique values 71 such as a media ID/key, volume ID/key, content ID/key, and device ID/key, as indicated by a broken line in FIG. 16. The protected program key 67 which has undergone the protection processing is distributed to players as an encrypted content in the form of electrical delivery or physical media that record the content, as shown in step P6.

(Step P3 (Protect Content))

A content 66 undergoes protection processing using a content key 65, and is processed as a protected content 70.

In this case, additional processing may be applied to at least a part of a content using the content code 29. The additional processing may include, for example, data conversion, encryption, and replacement processes. The protected content 70 is distributed to players as an encrypted content in the form of electrical delivery or physical media that record the content, as shown in step P6.

(Step P4 (Transform Key))

The content key 65 used to encrypt the content is transformed according to a key transformation method included in the content code 29, and is transformed as a transformed content key. In this case, additional processing may be similarly executed using the unique values 71.

(Step P5 (Protect Transformed Content Key))

Subsequently, the transformed content key undergoes protection processing, and is processed as protected content keys (Ck0e, Ck1e, Ck2e, . . . ) 69. In this case, the unique values 71 such as a media ID/key, volume ID/key, content ID/key, and device ID/key may be used in the key transformation processing and protection processing. In this case, the order of the key transformation processing in step P4 and the protection processing in step P5 may be reversed, and the key transformation processing may be executed after the protection processing. Also, a structure other than a series processing connection (that is, one processing includes the other processing) may be adopted. The protected content keys 69 are distributed to players in the form of electrical delivery or physical media that record them, as shown in step P6.

3-2. Format Stored in Physical Storage Medium

Figure 17B:
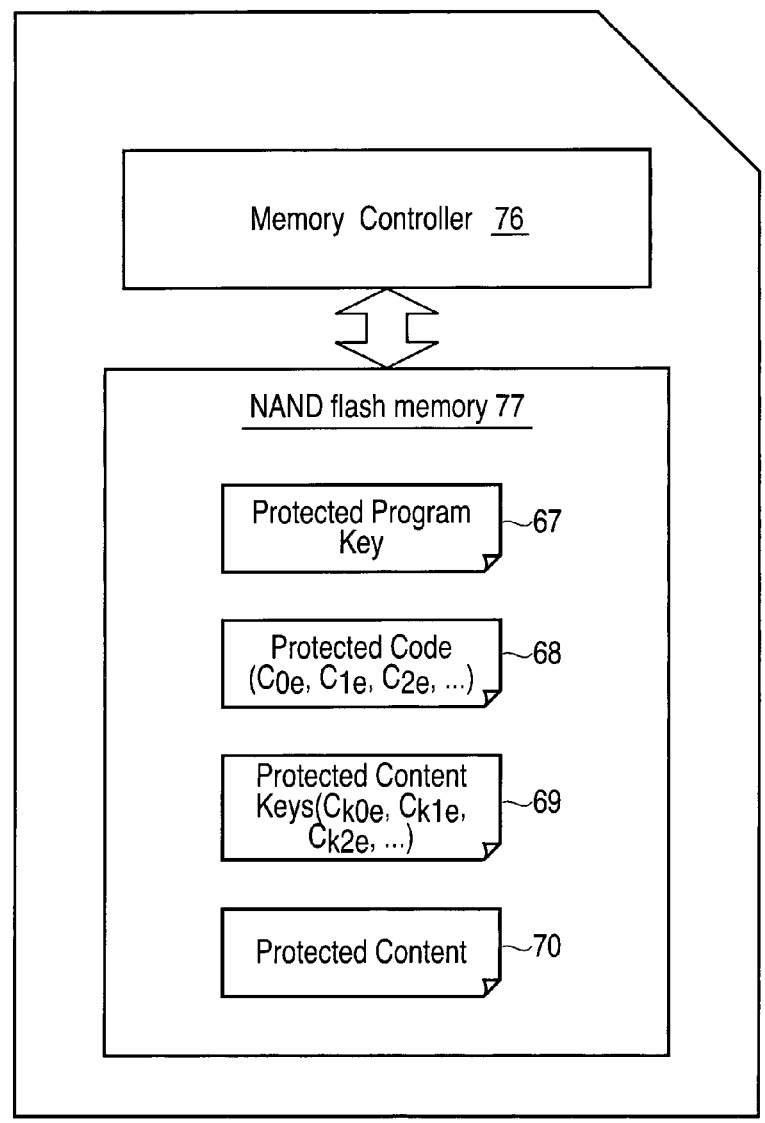
FIG. 17B is a view showing an example of a storage medium after the encryption processing according to the first embodiment.

As a result of step P6 of the encryption processing, the protected program key 67 and the like stored as an encrypted content in a physical storage medium are shown in, for example, FIGS. 17A and 17B.

In the example shown in FIG. 17A, a storage medium stores, as the encrypted content, the protected program key 67, protected code (C0e, C1e, C2e, . . . ) 68, protected content keys (Ck0e, Ck1e, Ck2e, . . . ) 69, and protected content 70, which have undergone the protection processing. This storage medium is distributed to players.

More specifically, the example shown in FIG. 17B shows an example of an SD Card®. The SD card includes a memory controller 76 and a NAND flash memory 77 of a nonvolatile semiconductor memory. The memory controller 76 controls the overall operation of the NAND flash memory 77.

The NAND flash memory 77 stores, as the encrypted content, the protected program key 67, protected code (C0e, C1e, C2e, . . . ) 68, protected content keys (Ck0e, Ck1e, Ck2e, . . . ) 69, and protected content 70, which have undergone the protection processing. This SD card is similarly distributed to players.

Note that the encrypted content may be distributed to players in the form of electrical delivery via an electric communication line by means of, for example, downloading, as shown in step P6, in place of the storage media.

<4. Decryption Processing>

Decryption processing according to this embodiment will be described below using FIG. 18. The decryption processing according to this embodiment executes processing opposite to the encryption processing described using FIG. 16 in principle, and is processing executed by a player (on the player 300 side) marketed for consumers.

(Step UP0 (Electrically Delivered and/or Read from Storage))

In the form of electrical delivery of the encrypted content or a physical medium that stores the content, the program key 67, protected code 68, protected content keys 69, and protected content 70, which have undergone the protection processing, and also the unique values 71 are distributed to the player. The unique values 71 include, for example, a media ID/key, volume ID/key, content ID/key, and device ID/key. The unique values 71 are provided to the player by the same or different means.

(Step UP1 (Unprotect Program Key))

The protected program key 67 is decrypted as program keys (Kp0, Kp#n) 61 using the information 62 based on the device unique values. As described above, the decryption processing in this case uses the information 62 based on the device unique values.

In this case, the information 62 based on the device unique values may directly use device unique values, or may use indirect information derived using the device unique values. As an example of related information, a media key group corresponding to each information 62 based on the device unique values may be used. As a practical example, media key variants in the aforementioned SKB are indirect information, and device keys required to process the SKB and to derive the media key variants correspond to, for example, device unique information. Also, the indirect information may be derived using the unique values 71 such as a media ID/key, volume ID/key, content ID/key, and device ID/key. The decrypted program keys (Kp0, Kp#n) 61 are used in subsequent decryption processing.

(Step UP2 (Select & Unprotect Code))

The protected content code (C0e, C1e, C2e, . . . ) 68 is decrypted to the content code (C0, C#n) 64 by a content code selection/decryption unit of the player. The selection processing in this case uses content code selection numbers appended to the program keys 61 or device unique keys 71 and data, selection numbers which are determined in advance, or selection numbers provided by another means. The decryption processing uses the program keys 61. Alternatively, the selection or decryption processing may use the unique values 71 such as a media ID/key, volume ID/key, content ID/key, and device ID/key.

(Step UP3 (Select & Unprotect Key))

The protected content keys (Ck0e, Ck1e, Ck2e, . . . ) 69 are decrypted by a content key selection/decryption unit of the player, and are passed to step UP4.

(Step UP4 (Execute Code (Transform Key, Etc.)))

Subsequently, the content code (C0, C#n) 64 decrypts the content key 65 using, for example, the program keys 61 and transformed key, etc. by the virtual machine 30 of the player. When at least some processes of the protected content 70 have undergone additional processing by the content code 29, decryption processing for these processes are also executed in this step.

(Step UP5 (Unprotect Content))

The protected content 70 is decrypted to the content 66 using the content key 65.

(Step UP6 (Playback Control (Rendering, Etc.)))

The decrypted content 66 undergoes playback control as needed based on a code (execute code) executed by the virtual machine 30 of the player.

<5. Effects>

According to the protection method, decryption method, player, storage medium, and encryption apparatus of a digital content according to the first embodiment, at least effects (1) and (2) below are obtained.

(1) This embodiment is advantageous in enhancement of secrecy.

As shown in, for example, FIG. 16, the protection processing of a digital content (encryption processing of a digital content) according to the first embodiment distributes, together with the protected content 70, at least the encrypted protected program key 67, protected content keys (Ck0e, Ck1e, Ck2e, . . . ) 69, and protected code 68 including an individual instruction code (C1e, C2e, . . . ), at least some elements of which are designed according to a unique operation code specification for each content player or for each content player group.

In this manner, since the individual instruction codes (C1e, C2e, . . . ), at least some elements of which are individuated for respective content players or content player groups, are included, for example, even when a player using an individual instruction code (C1e) suffers vulnerability, and the contents of the individual instruction code (C1e) are exposed, a player group using another individual instruction code (C2e) is not influenced, thus preventing, for example, illicit copies of a digital content. In this way, the digital content protection can be enhanced, and this embodiment is advantageous in enhancement of secrecy.

(2) This embodiment can reduce an information volume, and is advantageous in prevention of deterioration of the productivity and compatibility.

In addition, the protected code 68 further includes a common instruction code (C0e) common to respective content players.

Since the common instruction code (C0e) common to respective content players is included, the information volume of a common part can be reduced, and this embodiment is advantageous in improvement of the productivity and compatibility.

(3) About decryption method, player, storage medium, and encryption apparatus of digital content The aforementioned decryption method (for example, FIG. 18, etc.), player (for example, FIGS. 4 and 5, etc.), storage medium (for example, FIG. 17, etc.), and encryption apparatus (for example, FIGS. 1 and 10, etc.) of a digital content similarly have the effects (1) and (2).

For example, a player which plays back a content protected by the digital content protection method according to the first embodiment is executed by the processor (instruction processor) 35 of the virtual machine 30 using the instruction tables 19 shown in FIG. 8.

The common instruction table 19-0 shown in (a) of FIG. 8 is an instruction table common to respective players.

The individual instruction tables (instruction tables #1 to #3) 19-1 to 19-3 shown in (b) of FIG. 8 are instruction tables which are obtained by individuating an instruction table, which indicates the assignment relationship between opcodes and the functions of the instruction set, for respective players or player groups.

For example, table #1 uses a sequence indicated by X(i), X(i+1), X(i+2), . . . as opcodes. Table #2 uses a sequence indicated by Y(i), Y(i+1), Y(i+2), . . . as opcodes. Table #3 uses a sequence indicated by Z(i), Z(i+1), Z(i+2), . . . as opcodes.

As a result, respective players each having the virtual machine 30 store tables, as shown in FIG. 9.

Player A shown in (a) stores the common instruction table 19-0 and individual instruction table (instruction table #1) 19-1 in its ROM.

Player B shown in (b) stores the common instruction table 19-0 and individual instruction table (instruction table #2) 19-2 in its ROM.

Player C shown in (c) stores the common instruction table 19-0 and individual instruction table (instruction table #3) 19-3 in its ROM.

In addition, as shown in FIGS. 10, 11, 12, 13, and 14, various cases can be advantageously applied as needed to generation of a content code.

[Aspect Included in this Embodiment]

The above comparative example and embodiment include the following aspects.

(1) A digital content protection method comprises distributing, together with an encrypted content, an encrypted protected program key, protected content key, and protected code including an individual instruction code, at least some elements of which are designed according to a unique operation code specification for each content player or for each content player group.

(2) In the digital content protection method described in (1), the protected code further includes a common instruction code, which is designed according to a common operation code specification common to the respective content players.

(3) In the digital content protection method described in (1) or (2), the individual instruction code is encrypted by a program key which is impossible to be derived by the content player or the content player group designed according to the different unique operation code specification.

(4) In the digital content protection method described in (3), the program key is encrypted by a key derived using unique information of the content player.

(5) In the digital content protection method described in (2) to (4), the common instruction code is encrypted by a program key which is allowed to be derived by an arbitrary content player group.

(6) In the digital content protection method described in (1) or (2), the individual instruction code and the common instruction code are compiled based on individual instruction tables and a common instruction table which include at least mnemonics and opcodes.

(7) In the digital content protection method described in (1) or (2), the common instruction code is allowed to be executed by the arbitrary content processing apparatus, and the individual instruction code is not allowed to be executed by the content processing apparatus or content processing apparatus group which is designated according to the different unique operation code specification.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A digital content protection method comprising:
generating, by a processor, a protected code by encrypting a content code including an individual instruction code;
generating, by the processor, a protected program key by encrypting a program key;
generating, by the processor, a protected content by encrypting a content with a content key;
generating, by the processor, a protected content key by encrypting the content key; and
distributing, by the processor, together with the protected content, the protected program key, the protected content key and the protected code, wherein
at least one element of the individual instruction code is designed according to a unique operation code specification for each content player or for each content player group,
the each content player and the each content player group include a memory holding a common instruction table which includes identical instructions as instructions in another content player or content player group and an individual instruction table which includes different instructions from instructions in another content player or content player group such that the individual instruction table included in the each content player and the each content player group are not included in the another content player or content player group,
the content code is generated based on the common instruction table and the individual instruction table,
the common instruction table and the individual instruction table are distinct and separate from one another, and when the common instruction table is hacked, the individual instruction table is used.

2. The method of claim 1, wherein the content code further includes a common instruction code which is designed according to a common operation code specification common to respective content players.

3. The device of claim 2, wherein the common instruction code is encrypted by the program key which is allowed to be derived by an arbitrary content player group.

4. The method of claim 1, wherein the individual instruction code is encrypted by the program key, the program key being encrypted based on a unique operation code specification corresponding to the content player or the content player group, and the content player or the content player group is designed according to a different unique operation code specification.

5. The method of claim 4, wherein the program key is encrypted by a key derived using unique information of the content player.

6. A digital content decryption method comprising:
retrieving, by a processor, together with a protected content, a protected program key, a protected code and a protected content key;
generating, by the processor, a program key by decrypting the protected program key;
generating, by the processor, a content code including an individual instruction code by decrypting the protected code;
generating, by the processor, a content key by decrypting the protected content key; and
generating, by the processor, a content by decrypting the protected content with the content key, wherein
at least one element of the individual protected code is designed according to a unique operation code specification for each content player or for each content player group,
the each content player and the each content player group include a memory holding a common instruction table which includes identical instructions as instructions in another content player or content player group and an individual instruction table which includes different instructions from instructions in another content player or content player group such that the individual instruction table included in the each content player and the each content player group are not included in the another content player or content player group,
the content code is generated based on the common instruction table and the individual instruction table,
the common instruction table and the individual instruction table are distinct and separate from one another, and
when the common instruction table is hacked, the individual instruction table is used.

7. The method of claim 6, wherein the content code further includes a common instruction code which is designed according to a common operation code specification common to respective content players.

8. The method of claim 7, wherein the common instruction code is decrypted by the program key which is allowed to be derived by an arbitrary content player group.

9. The method of claim 6, wherein the individual instruction code is decrypted by the program key which is allowed to be derived by the content player or the content player group which is designed according to the unique operation code specification.

10. The method of claim 9, wherein the program key is decrypted by a key derived using unique information of the content player.

11. A digital content player comprising:
a media interface configured to retrieve, together with a protected content, a protected program key, a protected content key and a protected code;
a decryption module configured to generate a content code including an individual instruction code by decrypting a protected code; and
a processor configured to play back a content, wherein
at least one element of the individual instruction code is designed according to a unique operation code specification for each content player or for each content player group, the each content player and the each content player group include a memory holding a common instruction table which includes identical instructions as instructions in another content player or content player group and an individual instruction table which includes different instructions from instructions in another content player or content player group such that the individual instruction table included in the each content player and the each content player group are not included in the another content player or content player group,
the content code is generated based on the common instruction table and the individual instruction table,
the common instruction table and the individual instruction table are distinct and separate from one another, and
when the common instruction table is hacked, the individual instruction table is used.

12. The player of claim 11, wherein the content code further includes a common instruction code which is designed according to a common operation code specification common to respective content players.

13. The player of claim 12, wherein the processor decrypts the common instruction code by a program key which is allowed to be derived by an arbitrary content player group.

14. The player of claim 11, wherein the processor decrypts the individual instruction code by a program key which is allowed to be derived by the content player or the content player group designed according to the unique operation code specification.

15. The player of claim 14, wherein the processor decrypts the program key by a key which is derived using unique information of the content player.

16. A non-transitory computer readable digital content storage medium having a computer program recorded thereon, the computer program configured to perform a method when executed on a computer, the method comprising:
generating a protected program key by encrypting a program key;
generating a protected code by encrypting a content code including an individual instruction code;
generating a protected content key by encrypting a content key; and
generating a protected content by encrypting a content with the content key, wherein
at least one element of the individual instruction code is designed according to a unique operation code specification for each content player or for each content player group,
the each content player and the each content player group include a memory holding a common instruction table which includes identical instructions as instructions in another content player or content player group and an individual instruction table which includes different instructions from instructions in another content player or content player group such that the individual instruction table included in the each content player and the each content player group are not included in the another content player or content player group, the content code is generated based on the common instruction table and the individual instruction table, the common instruction table and the individual instruction table are distinct and separate from one another, and when the common instruction table is hacked, the individual instruction table is used.

17. The medium of claim 16, wherein the content code further includes a common instruction code which is designed according to a common operation code specification common to respective content players.

18. The medium of claim 17, wherein the common instruction code is encrypted by the program key which is allowed to be derived by an arbitrary content player group.

19. The medium of claim 16, wherein the individual instruction code is encrypted by the program key, the program key being encrypted based on a unique operation code specification corresponding to the content player or the content player group, and the content player or the content player group is designed according to a different unique operation code specification.

20. The medium of claim 19, wherein the program key is encrypted by a key derived using unique information of the content player.

21. A digital content encryption apparatus comprising:
a processor configured to generate a protected code by encrypting a content code including an individual instruction code; and
a writing module configured to write a protected content and the protected code in a digital content storage medium, wherein
at least one element of the individual instruction code is designed according to a unique operation code specification for each content player or for each content player group, the each content player and the each content player group include a memory holding a common instruction table which includes identical instructions as instructions in another content player or content player group and an individual instruction table which includes different instructions from instructions in another content player or content player group such that the individual instruction table included in the each content player and the each content player group are not included in the another content player or content player group, the content code is generated based on the common instruction table and the individual instruction table, the common instruction table and the individual instruction table are distinct and separate from one another, and when the common instruction table is hacked, the individual instruction table is used.

22. The apparatus of claim 21, wherein the content code further includes a common instruction code which is designed according to a common operation code specification common to respective content players.

23. The apparatus of claim 22, wherein the processor encrypts the common instruction code by a program key which is allowed to be derived by an arbitrary content player group.

24. The apparatus of claim 21, wherein the processor encrypts the individual instruction code by a program key, the program key being encrypted based on a unique operation code specification corresponding to the content player or the content player group, and the content player or the content player group is designed according to a different unique operation code specification.

25. The apparatus of claim 24, wherein the processor encrypts the program key by a key which is derived using unique information of the content player.

* * * * *